US012269153B2

(12) United States Patent
Newman

(10) Patent No.: US 12,269,153 B2
(45) Date of Patent: Apr. 8, 2025

(54) MULTI-TOOL DEVICE

(71) Applicant: NEWMAN PRODUCTS, LLC, Pataskala, OH (US)

(72) Inventor: Michael Scott Newman, Pataskala, OH (US)

( * ) Notice: Subject to any disclaimer, the term of this patent is extended or adjusted under 35 U.S.C. 154(b) by 985 days.

(21) Appl. No.: 16/639,201

(22) PCT Filed: Aug. 21, 2018

(86) PCT No.: PCT/US2018/047177
§ 371 (c)(1),
(2) Date: Feb. 14, 2020

(87) PCT Pub. No.: WO2019/040401
PCT Pub. Date: Feb. 28, 2019

(65) Prior Publication Data

US 2020/0171642 A1 Jun. 4, 2020

Related U.S. Application Data

(60) Provisional application No. 62/548,901, filed on Aug. 22, 2017.

(51) Int. Cl.
*B25F 1/00* (2006.01)
*B25F 1/04* (2006.01)
*B25G 1/08* (2006.01)

(52) U.S. Cl.
CPC ................ *B25F 1/003* (2013.01); *B25F 1/04* (2013.01); *B25G 1/085* (2013.01)

(58) Field of Classification Search
CPC .......... B25F 1/003; B25F 1/104; B25G 1/085; B25B 13/5058; B25B 1/003; B25B 1/104
(Continued)

(56) References Cited

U.S. PATENT DOCUMENTS 15,184 A * 6/1856 Jenks .................. B25B 13/5058 81/97
RE8,961 E * 11/1879 Rhyn ................................ 81/99
(Continued)

FOREIGN PATENT DOCUMENTS

DE 33701 4/1885
JP 11071105 9/2000
(Continued)

OTHER PUBLICATIONS

Product literature, Lee Valley, Chestnut Tools pocket wrench, from image in client's search report dated May 11, 2017, https://www.leevalley.com/en-ca/shop/tools/hand-tools/wrenches-and-ratchets/72640-pocket-wrench.
(Continued)

*Primary Examiner* — Hadi Shakeri
(74) *Attorney, Agent, or Firm* — Ronald J. Koch; The Eley Law Firm

(57) ABSTRACT

A multi-tool device is disclosed including a separable hinge architecture and an open-ended wrench mechanism. The open-ended wrench mechanism including a frame member with integrated or separate outer jaw, and a sliding and rotating inner jaw, and a spring to bias the jaws closed. Various means to arrest the motion on the stroke are presented. The hinge embodies two parallel rotational joints through positive or negative orifice allowing mechanical fastening of two multi-tool modules to be paired and locked rotationally through common means in selectable positions.

4 Claims, 22 Drawing Sheets

(58) Field of Classification Search
USPC .............................................................. 7/118
See application file for complete search history.

(56) References Cited

U.S. PATENT DOCUMENTS 231,303 A 8/1880 Franke
447,952 A * 3/1891 Keith .................. B25B 13/5058 81/186
756,565 A * 4/1904 Barry ...................... B25B 13/22 81/135
762,351 A * 6/1904 Sanders ................ B25B 13/505 81/145
844,905 A * 2/1907 Young ....................... B25B 5/04 81/131
878,024 A * 2/1908 Sinclars .................. B25B 13/22 81/134
929,125 A 7/1909 Garner
952,955 A * 3/1910 Shoop ................. B25B 13/5058 81/97
1,060,513 A 4/1913 Tish
1,082,601 A 12/1913 McCarthy
1,163,233 A * 12/1915 Haban ................. B25B 13/5058 81/106
1,208,464 A * 12/1916 Booth et al. ............ B25B 13/22 81/139
1,255,206 A * 2/1918 Moore .................... B25B 13/12 81/146
1,351,519 A 8/1920 Kelly et al.
1,428,546 A 9/1922 Johnston
2,022,855 A * 12/1935 Gross ...................... B25B 13/12 81/134
2,459,882 A * 1/1949 Johnson .................. B25B 13/16 81/99
2,471,734 A * 5/1949 Fischer ................... B25B 13/16 81/356
2,577,888 A 12/1951 Greathouse
2,612,808 A * 10/1952 Small ...................... B25B 13/28 81/134
3,000,245 A 9/1961 Orr
3,659,485 A 5/1972 Roth
3,817,128 A 6/1974 Evans
3,862,582 A 1/1975 Nockleby
3,892,150 A 7/1975 Horton
3,983,768 A 10/1976 Smith
D281,318 S 11/1985 Davidson
4,616,536 A 10/1986 Knebel
4,744,272 A 5/1988 Leatherman
5,267,366 A 12/1993 Frazer
5,280,659 A 1/1994 Park
D401,133 S 11/1998 Gardiner et al.
D409,893 S 5/1999 Gardiner et al.
7,174,590 B1 2/2007 Quenzi
D557,100 S 12/2007 Stokes et al.
D601,970 S 10/2009 Peng et al.
D603,682 S 11/2009 Brands
D635,004 S 3/2011 Rivera et al.
8,857,299 B2 10/2014 Huttula et al.
D768,501 S 10/2016 Spenceman et al.
2002/0023302 A1 2/2002 Montague et al.
2003/0154552 A1 8/2003 Oka
2005/0011010 A1 1/2005 Anderson et al.
2006/0137497 A1 6/2006 Whiteford
2006/0144197 A1 7/2006 Choi
2007/0209121 A1 9/2007 Rivera
2012/0227187 A1 9/2012 Caniparoli et al.

FOREIGN PATENT DOCUMENTS

JP 2006-502876 A 1/2006
KR 200385860 Y1 6/2005
WO WO2008003817 A 1/2008

OTHER PUBLICATIONS

Product literature, Leatherman, Jam and Style PS, Pocket Tool, from image in client's search report dated May 11, 2017, https://www.leatherman.com/jam-style-ps-336.html.
Product literature, ColaTool, Kobalt Folding Clamp Wrench with Knife 498925, from image in client's search report dated May 11, 2017, https://colatool.mybigcommerce.com/kobalt-folding-clamp-wrench-with-knife-498925/.
Product literature, Amazon, Workpro 8-in-1 Multitool, from image in client's search report dated May 11, 2017, https://www.amazon.com/WORKPRO-Multi-Tool-Adjustable-Wrench/dp/B015W3C840.
Product literature, OpenSky, Protocol 9 in 1 Hammer Pilers Wrench Multitool, from image in client's search report dated May 11, 2017, https://www.opensky.com/fenam/product/stainless-steel-9-in-1-hammer-pilers-wrench-multitool-1?max_discount=1&configurationId=5a840d995078a8293f21c2cd&osky_origin=googlepla&osky_source=cpc&osky_campaign=OpenSkySmartShopping&gclid=EAlalQobChMli6j_y9G46AIVT9yGCh2pCwxeEAQYAyABEgLU6vD_BwE.
Product literature, Amazon, dpnao Multitool wrench with 7 tools, from image in client's search report dated May 11, 2017, https://www.amazon.com/DPNAO-Multitool-Screwdriver-Multifunctional-Adjustable/dp/B07KTVG5PS.
Product literature, Amazon, MinChen Wrench Multitool, from image in client's search report dated May 11, 2017, https://www.amazon.com/MinChen-Wrench-Multipurpose-Screwdrivers-Durable/dp/B01N808Q5V.
Product literature, Spyderco, Spyderench T01, Feb. 8, 2020, https://www.spyderco.com/catalog/details/T01/286.
Product literature, Spyderco, Byrdrench BY15P, Feb. 8, 2020, https://spyderco.com/catalog/details.php?product=241.
International Search Report, Patent Cooperation Treaty Application No. PCT/US2018/047177, Mailed Dec. 7, 2018.

* cited by examiner

MULTI-TOOL DEVICE

CROSS-REFERENCE TO RELATED APPLICATIONS

This application claims priority to U.S. provisional application 62/548,901, filed Aug. 22, 2017, the entire contents of the application being incorporated by reference.

FIELD

The invention generally relates to a multi-tool device. More particularly, the invention relates to a multi-tool device that contains a modular set of tools that are easy to use, and can be readily carried by a user thereof.

BACKGROUND

It is not convenient to carry an entire set of tools to the site of repairs, and emergency repairs demand that tools be readily at hand for maximum efficiency. It is also inconvenient to switch tools for different applications.

Conventional multi-tools have been developed to address this issue by producing easily carriable tools that have multiple functions available. However, these conventional multi-tools have not addressed torqueing needs sufficiently and can be unwieldy, ineffective, or inconvenient to use. Also, conventional multi-tools have integral tools that are not modular, and thus, conventional multi-tools have a finite complement of tools. To have other tools available, one must purchase a completely different tool.

In addition, various attempts at producing universal, carriable wrenches exist, but they all fall short in some area. For example, these conventional carriable wrenches can be difficult to adjust, have a limited size span, limited torqueing length, must be manually repositioned, are bulky, etc.

Therefore, a need exists for a multi-tool device that is easier to use, and contains a more capable set of modular hand tools that can be carried easily.

SUMMARY

Accordingly, the present invention is directed to a multi-tool device that substantially obviates one or more problems resulting from the limitations and deficiencies of the related art.

In accordance with one or more embodiments of the present invention, there is provided a multi-tool device that includes a handle portion and an open-ended wrench mechanism. The open-ended wrench mechanism includes a wrench frame member that defines an outer jaw portion of the open-ended wrench mechanism, the wrench frame member further defining a slot therein; an inner jaw member displaceably coupled to the wrench frame member by means of a sliding pivot, a portion of the inner jaw member being received within the slot of the wrench frame member; and a spring member configured to bias the inner jaw member towards a closed position with the outer jaw portion of the wrench frame member. In these one or more embodiments, the outer jaw portion of the wrench frame member is configured to cooperate with the inner jaw member so as to permit the open-ended wrench mechanism to apply a torque to a fastener when a user applies a force to the handle portion of the multi-tool device.

In a further embodiment of the present invention, the wrench frame member comprises a first bearing face and the inner jaw member comprises a second bearing face, the first bearing face of the wrench frame member being disposed in an opposed relationship with the second bearing face of the inner jaw member, the first bearing face of the wrench frame member having a first set of contours configured to cooperate with a second set of contours on the second bearing face of the inner jaw member. When the open-ended wrench mechanism is in an engaged, tightening position, the first and second sets of contours of the respective first and second bearing faces are configured to provide a tightening contact between fastener contact faces of the open-ended wrench mechanism and the fastener at a predetermined angle relative to a line of action of the sliding pivot as the open-ended wrench mechanism is being rotated in a tightening direction. When the first and second bearing faces of the open-ended wrench mechanism are in a non-engaged position, the fastener contact faces are configured to operate as follower surfaces of the open-ended wrench mechanism around the fastener as the open-ended wrench mechanism is being rotated relative to the fastener in a non-tightening direction.

In yet a further embodiment, the first bearing face of the wrench frame member comprises a first rack gear portion forming the first set of contours, and second bearing face of the inner jaw member comprises a second rack gear portion forming the second set of contours, the first rack gear portion being disposed in an opposed relationship with the second rack gear portion.

In still a further embodiment, the wrench frame member or the inner jaw member comprises a rotation limiting member configured to constrain rotation of the inner jaw member to a predetermined angle about the sliding pivot so as to limit the rotation of the inner jaw member relative to the wrench frame member.

In accordance with one or more other embodiments of the present invention, there is provided a multi-tool device that includes a first tool subassembly having an inner face and an outer face, the inner face of the first tool subassembly being oppositely disposed relative to the outer face of the first tool subassembly; a second tool subassembly having an inner face and an outer face, the inner face of the second tool subassembly being oppositely disposed relative to the outer face of the second tool subassembly; and a hinge member rotatably coupling the first tool subassembly to the second tool subassembly, the hinge member defining a first rotational axis about which the first tool subassembly is able to pivot and a second rotational axis about which the second tool subassembly is able to pivot, the first rotational axis being generally parallel to the second rotational axis, and the first rotational axis being spaced from the second rotational axis by a predetermined distance that allows the first tool subassembly to fold into a configuration whereby the first tool subassembly is disposed substantially parallel to the second tool subassembly and the inner face of the first tool subassembly is disposed in an opposed relationship to the inner face of the second tool subassembly.

In a further embodiment of the present invention, the first tool subassembly comprises one or more tool members, and the second tool subassembly comprises one or more additional tool members.

In yet a further embodiment, the one or more tool members of the first tool subassembly include a pair of folding pliers, the folding pliers having a first handle end and a second head end with a plier head oppositely disposed relative to the first handle end, the first handle end of the folding pliers comprising a pair of spaced-apart apertures, a first one of the pair of spaced-apart apertures being disposed on a first handle portion of the folding pliers and a second one of the pair of spaced-apart apertures being disposed on a second handle portion of the folding pliers, the spaced-apart apertures configured to be collinear with one another in a closed position of the first and second handle portions of the folding pliers, and the hinge member of the multi-tool device further comprising a pair of collinear posts disposed along the first rotational axis of the hinge member that are configured to be received within respective ones of the spaced-apart apertures when the first tool subassembly is engaged with the second tool subassembly.

In still a further embodiment, the first tool subassembly is configured to be detached from the second tool subassembly by disengaging the pair of collinear posts of the hinge member from the respective ones of the spaced-apart apertures on the first and second handle portions of the folding pliers, and wherein the first tool subassembly is configured to be attached to the second tool subassembly by engaging the spaced-apart apertures on the first and second handle portions of the folding pliers with respective ones of the collinear posts of the hinge member, and by locking the first and second handle portions of the folding pliers in place relative to one another using the plier head at the second head end of the folding pliers.

In yet a further embodiment, one of the first tool subassembly, the second tool subassembly, and the hinge member is further provided with a rotation limiting member to constrain the rotation of the first tool subassembly relative to the second tool subassembly.

In still a further embodiment, the hinge member further comprises a first face and a second face oppositely disposed relative to the first face, at least one of the first face and the second face being provided with a recess formed therein for receiving a fastener driving member.

In yet a further embodiment, the recess for receiving a fastener driving member is substantially centered on the hinge member such that a longitudinal axis of the recess substantially corresponds to a central axis of the multi-tool device when the inner face of the first tool subassembly is folded against the inner face of the second tool subassembly.

In still a further embodiment, each of the first and second faces of the hinge member comprises a recess formed therein for receiving a respective fastener driving member.

In accordance with yet one or more other embodiments of the present invention, there is provided a multi-tool device that includes a pair of folding pliers. The pair of folding pliers include a plier handle body portion, the plier handle body portion including a first handle member and a second handle member; and a plier head portion coupled to the plier handle portion, the plier head portion including a first jaw member pivotally coupled to a second jaw member about a first rotational axis, the plier head portion configured to be folded into the plier handle body portion in a stowed configuration of the folding pliers, and each of the first and second jaw members having first ends for engaging an object being manipulated by the pliers and oppositely disposed second ends that are pivotally coupled to respective first and second handle members, the second ends of first and second jaw members configured to pivot relative to the respective first and second handle members about respective second and third rotational axes.

In a further embodiment of the present invention, one of the first handle member and the second handle member is foldable relative to the other of the first handle member and the second handle member about the first rotational axis so as to define an operative, unfolded state of the folding pliers and an inoperative, folded state of the folding pliers. When the folding pliers are in the folded state, the second and third rotational axes about which the second ends of the first and second jaw members are configured to pivot relative to the respective first and second handle members are collinear with one another.

In yet a further embodiment, the first and second handle members are pivotally coupled to outer faces of the first and second jaw members at the second ends of first and second jaw members. When the folding pliers are in the folded state, the first and second handle members are disposed generally parallel to one another.

In still a further embodiment, when the plier head portion is folded into the plier handle body portion, the first and second handle members are locked into the folded state.

In yet a further embodiment, one of the first handle member and the second handle member comprises a notch formed therein for receiving a tip of the plier head portion so as to fix the first and second jaw members into a closed position.

In accordance with still one or more other embodiments of the present invention, there is provided a multi-tool device that includes a tool body portion including one or more tool members and a driver bit extension holding portion. The driver bit extension holding portion includes a driver bit extension cradle formed by the tool body portion, the driver bit extension cradle configured to receive a portion of a driver bit extension; and a retention member configured to retain the driver bit extension in the driver bit extension cradle, the retention member configured to extend along a portion of the length of the driver bit extension and circumscribe a circumferential portion of the driver bit extension.

In a further embodiment of the present invention, the retention member of the driver bit extension holding portion is in the form of a cantilevered spring member configured to apply a retaining force to the driver bit extension that directs the driver bit extension into the driver bit extension cradle.

In yet a further embodiment, the cantilevered spring member comprises a downturned section that is configured to circumscribe the circumferential portion of the driver bit extension, the downturned section of the cantilevered spring member configured to apply the retaining force to the driver bit extension.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE DRAWINGS

Further features of the inventive embodiments will become apparent to those skilled in the art to which the embodiments relate from reading the specification and claims with reference to the accompanying drawings, in which:

Throughout the figures, the same parts are always denoted using the same reference characters so that, as a general rule, they will only be described once.

DETAILED DESCRIPTION

Figure 1:
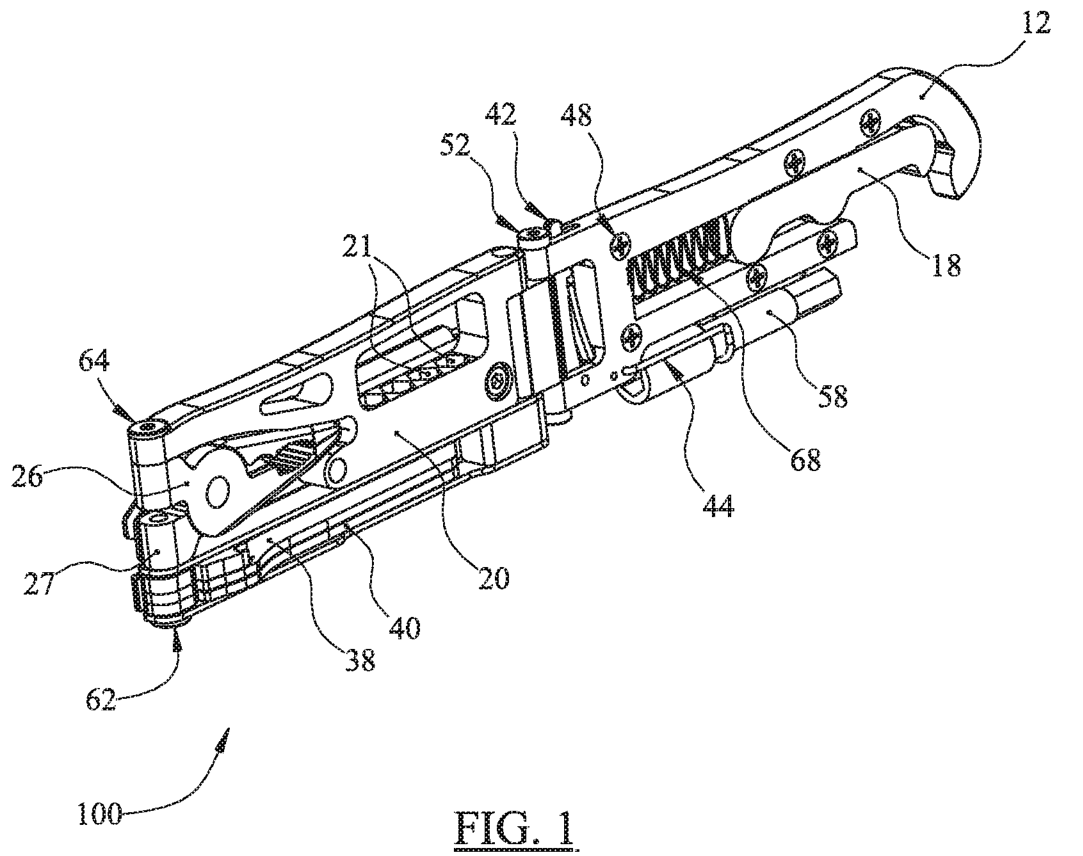
FIG. 1 is a perspective view of a multi-tool device, according to an embodiment of the invention, wherein the two halves of the multi-tool device are in their unfolded state and the side cover of the wrench portion of the multi-tool device has been removed to illustrate the internal components of the wrench portion.
Figure 2:
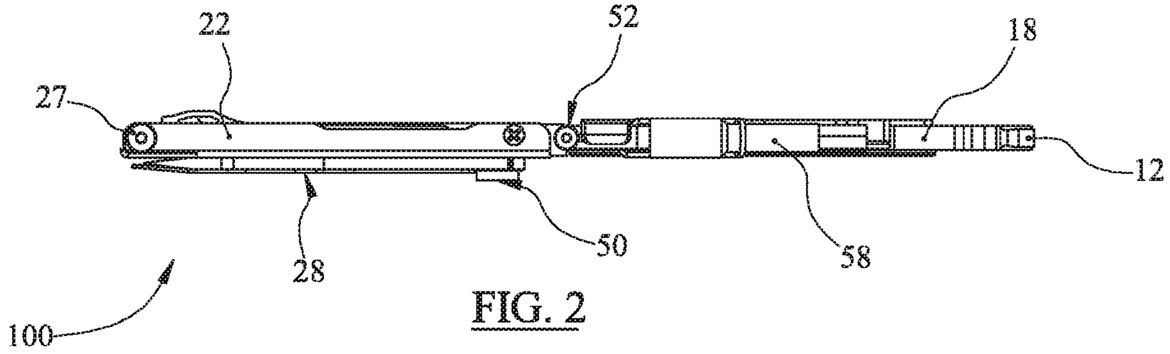
FIG. 2 is a bottom plan view of the multi-tool device of FIG. 1.

In the discussion that follows, like reference numerals are used to refer to like structures and elements in the various figures.

An illustrative embodiment of a multi-tool device is seen generally at 100 in FIGS. 1-3, 5-22, and 25. In the illustrated embodiment, the multi-tool device 100 is in the form of a separable, modular multi-tool with a self-adjusting, open-ended, ratcheting wrench mechanism. As will be described in detail hereinafter, the multi-tool device 100 advantageously contains a plurality of different tools in one compact arrangement, such as the open-ended wrench mechanism, a hinge member that receives a fastener driving member for applying a torque to a fastener, a pair of folding pliers, a folding knife, a folding metal saw blade, and a folding wood saw blade.

Initially, with reference to FIGS. 1-4, the open-ended wrench mechanism of the multi-tool device 100 of the illustrative embodiment will be explained. As shown in FIGS. 1 and 4, the open-ended wrench mechanism (i.e., wrench portion 72—see FIG. 4) generally comprises (i) a wrench frame member 12 that defines an outer jaw portion of the open-ended wrench mechanism, the wrench frame member 12 further defining a longitudinally-extending slot 74 therein (see FIG. 4); (ii) an inner jaw member 18 displaceably coupled to the wrench frame member 12 by means of a sliding pivot 76, a portion of the inner jaw member 18 being received within the slot 74 of the wrench frame member 12; and (iii) a spring member 68 configured to bias the inner jaw member 18 towards a closed position with the outer jaw portion of the wrench frame member 12. The outer jaw portion of the wrench frame member 12 is configured to cooperate with the inner jaw member 18 so as to permit the open-ended wrench mechanism to apply a torque to a fastener (e.g., a head of a bolt or nut) when a user applies a force to a handle portion 20 of the multi-tool device 100 (see FIG. 3).

Referring again to FIG. 4, it can be seen that the wrench frame member 12 comprises a first bearing face 78 and the inner jaw member 18 comprises a second bearing face 80. The first bearing face 78 of the wrench frame member 12 is disposed in an opposed relationship with the second bearing face 80 of the inner jaw member 18. The first bearing face 78 of the wrench frame member 12 has a first set of contours configured to cooperate with a second set of contours on the second bearing face 80 of the inner jaw member 18. When the open-ended wrench mechanism of the multi-tool device 100 is in an engaged, tightening position, the first and second sets of contours of the respective first and second bearing faces 78, 80 are configured to provide a tightening contact between the fastener contact faces of the open-ended wrench mechanism and a fastener (e.g., a head of a bolt or nut) at a predetermined angle (e.g., 20 degrees) relative to a line of action of the sliding pivot 76 as the open-ended wrench mechanism is being rotated in a tightening direction. Conversely, when the first and second bearing faces 78, 80 of the open-ended wrench mechanism are in a non-engaged position, the fastener contact faces are configured to operate as follower surfaces of the open-ended wrench mechanism around the fastener (e.g., a head of a bolt or nut) as the open-ended wrench mechanism is being rotated relative to the fastener in a non-tightening direction. As depicted in the illustrated embodiment, the first bearing face 78 of the wrench frame member 12 comprises a first rack gear portion forming the first set of contours, and second bearing face 80 of the inner jaw member 18 comprises a second rack gear portion forming the second set of contours. The first rack gear portion is disposed in an opposed relationship with the second rack gear portion.

In the illustrated embodiment, the inner jaw member 18 comprises a rotation limiting member 82 (i.e., in form of a semi-circular protrusion) configured to constrain rotation of the inner jaw member 18 to a predetermined angle (e.g., 2 degrees) about the sliding pivot 76 so as to limit the rotation of the inner jaw member 18 relative to the wrench frame member 12. As such, the inner jaw member 18 is able to rotate about the sliding pivot 76 between two terminal angles (e.g., between zero and 2 degrees). In one or more alternative embodiments, the rotation limiting member may be provided on the wrench frame member 12, rather than on the inner jaw member 18.

Figure 5:
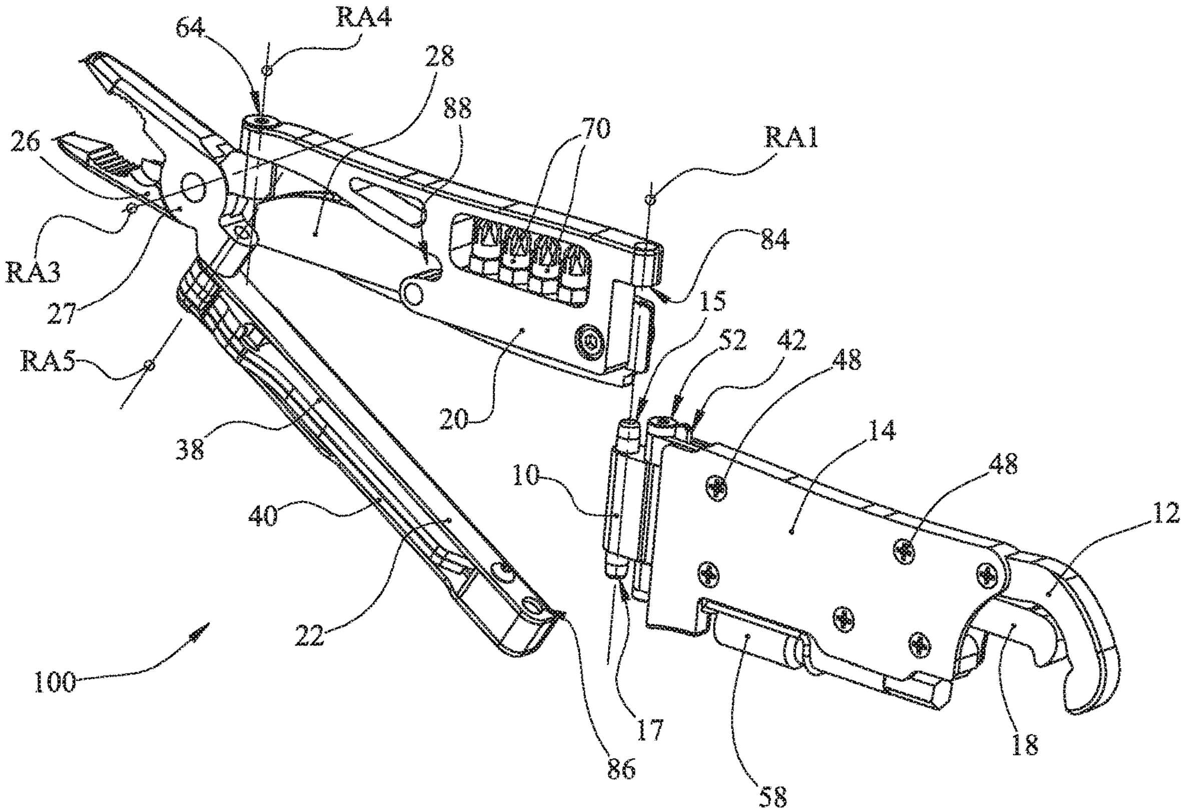
FIG. 5 is another perspective view of the multi-tool device of FIG. 1, wherein the first half of the multi-tool device is shown separated from the second half of the multi-tool device so that the pliers on the first half of the multi-tool device may be used.
Figure 15:
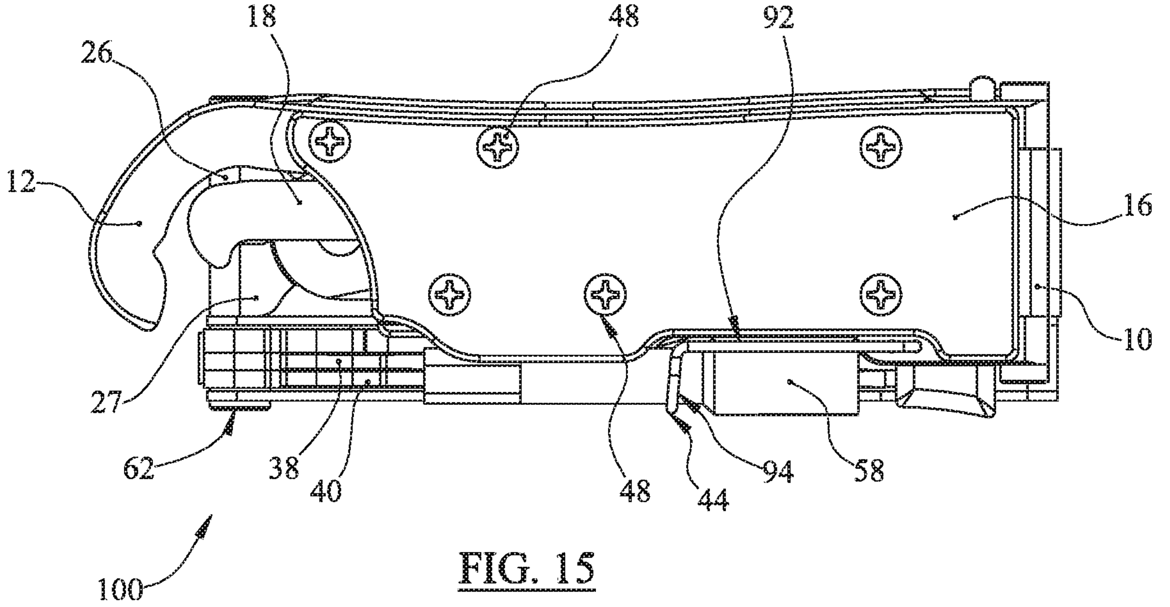
FIG. 15 is a second side elevational view of the wrench portion of the multi-tool device of FIG. 1 in its folded state, wherein the side of the multi-tool device containing the wrench is illustrated.
Figure 16:
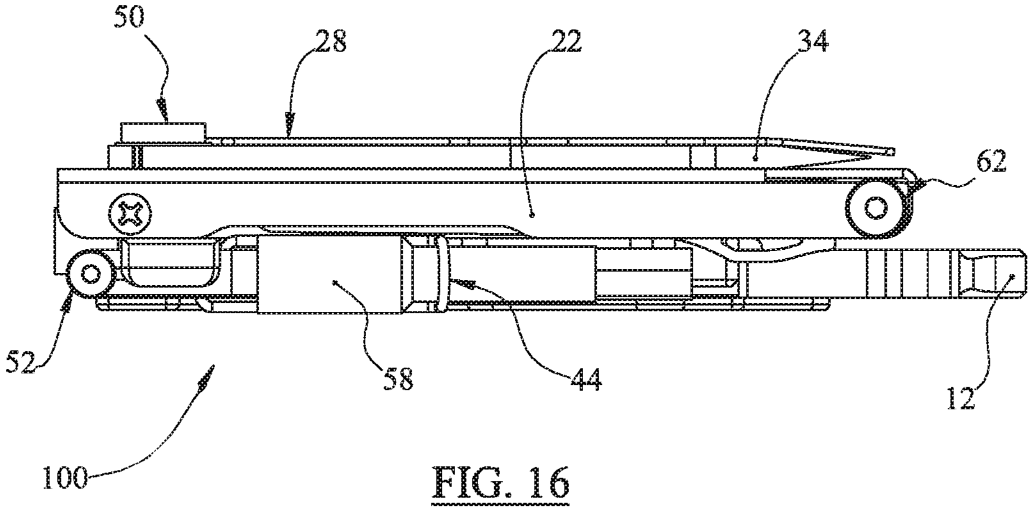
FIG. 16 is a bottom plan view of the multi-tool device of FIG. 1 in its folded state.
Figure 17:
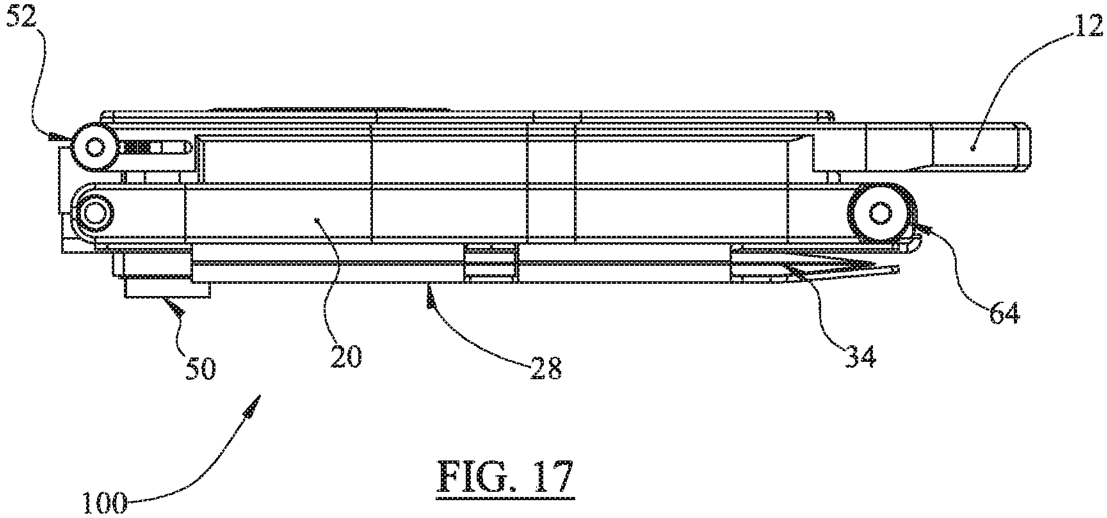
FIG. 17 is a top plan view of the multi-tool device of FIG. 1 in its folded state.
Figure 18:
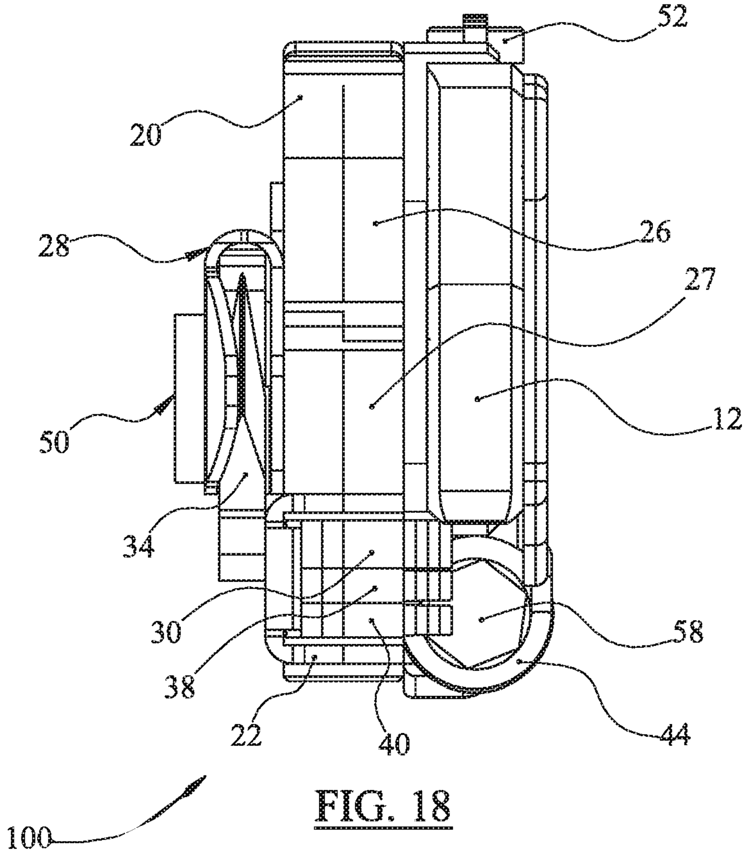
FIG. 18 is a first end view of the multi-tool device of FIG. 1 in its folded state, wherein the head end of the wrench is illustrated.

With combined reference to FIGS. 5, 15, 24, and 25, it can be seen that, in the illustrative embodiment, the open-ended wrench mechanism of the multi-tool device 100 further comprises two cover members 14, 16 that conceal the internal portion of the wrench frame member 12 and the inner jaw member 18. The first cover member 14 of the open-ended wrench mechanism comprises upper and lower flange portions and a finger choil (see FIG. 25). As shown in FIG. 5, the first cover member 14 is secured to a first side of the wrench frame member 12 by means of a plurality of fastener members (e.g., six (6) screw members 48). The second cover member 16 of the open-ended wrench mechanism is in the form of a flat plate (see FIG. 25). As shown in FIG. 15, the second cover member 16 is secured to a second side of the wrench frame member 12 by means of a plurality of fastener members (e.g., six (6) screw members 48).

During the operation of the open-ended wrench mechanism, when the first and second gear rack portions are rotated into contact by components of the reaction force on the jaw face resulting from rotating the jaws about the central axis of the fastener (e.g., a head of a bolt or nut), the gear teeth mesh and movement of the inner jaw member 18 is thus arrested on the line of action of the spring 68. It is to be noted that the ratio of the reaction force components to the force as a whole is set by the aforedescribed predetermined angle. Once the first and second gear rack portions are rotated into contact with one another, the jaw is locked in place, which allows torque to be applied through the jaw faces to the fastener. Conversely, when the assembly is rotated in the opposite direction about the fastener, friction and reaction forces from fastener contact unmesh the rack teeth and rotate the jaw to the other extreme position, set by the rotation limiting member 82. In this position, the inner jaw member 18 is free to slide on the line of action of the sliding pivot 76 against the spring 68. The face of the jaw is then able to follow around the fastener, using the surface of the fastener as a cam, to a new position in relation to fastener. By rotating the jaw assembly on the rotational axis of the fastener in alternating strokes, the fastener is rotated in one direction on each closed stroke and the open-ended wrench mechanism is repositioned in relation to the fastener on the open stroke, resulting in ratcheted unidirectional rotational displacement of the fastener.

It is readily apparent that the aforedescribed open-ended wrench mechanism of the multi-tool device 100 offers numerous features and benefits. First of all, the innovative design of the open-ended wrench mechanism allows it to be used on a wide range of fastener sizes, and thus, it is scalable in this regard. Secondly, the open-ended wrench mechanism cams about surfaces in one direction and locks in place in the other direction for ratcheting action. Thirdly, no manual adjustment is necessary with the open-ended wrench mechanism. The self-adjusting jaws of the open-ended wrench mechanism require only to be manually opened to provide fit clearance around the fastener. Upon release, the jaws will automatically spring to the face of the fastener and ratcheting can begin. Fourthly, the open jaws of the open-ended wrench mechanism allow use on objects, such as pipe fittings, etc., where closed jaws cannot go. Fifthly, because the jaws are to the fore of the tool, and the mechanism is centered along the torqueing length of the tool, minimal clearance is required for the head of the wrench in tight spaces. Sixthly, the geometry of the wrench is such so as to allow high torques to be applied without breakage provided that the wrench is formed from a material (e.g., steel) having a sufficient strength. Seventhly, the jaws by nature of the tool interface the fastener at two locations. Advantageously, these occur on the face of the fastener and not at the corners, thereby eliminating rounding. Eighthly, higher applied torque on the wrench results in a higher clamping force on the fastener, thereby eliminating slip.

Next, with reference to FIGS. 5-19 and 21-23, the structure and functionality of the hinge member 10 of the multi-tool device 100 of the illustrative embodiment will be explained. Referring initially to FIGS. 9, 10, 16, and 17, it can be seen that multi-tool device 100 generally comprises (i) a first tool subassembly (i.e., first tool half with folding pliers and folding knife) having an inner face and an outer face, the inner face of the first tool subassembly being oppositely disposed relative to the outer face of the first tool subassembly; (ii) a second tool subassembly (e.g., the second tool half with the open-ended wrench mechanism) having an inner face and an outer face having a finger choil, the inner face of the second tool subassembly being oppositely disposed relative to the outer face of the second tool subassembly; and (iii) a hinge member 10 rotatably coupling the first tool subassembly to the second tool subassembly (see FIG. 9), the hinge member 10 defining a first rotational axis RA1 about which the first tool subassembly is able to pivot and a second rotational axis RA2 about which the second tool subassembly is able to pivot, the first rotational axis RA1 being generally parallel to the second rotational axis RA2, and the first rotational axis RA1 being spaced from the second rotational axis RA2 by a predetermined distance (e.g., 8.73 millimeters) that allows the first tool subassembly to fold into a configuration whereby the first tool subassembly remains attached to, and is disposed substantially parallel to the second tool subassembly, and the inner face of the first tool subassembly is disposed in an opposed relationship to the inner face of the second tool subassembly (see e.g., FIGS. 14-19 for folded configuration of multi-tool device 100). As will be described in further detail hereinafter, the hinge member 10 advantageously allows separable hinging between the first and second tool subassemblies (see e.g., FIGS. 5-7).

Figure 9:
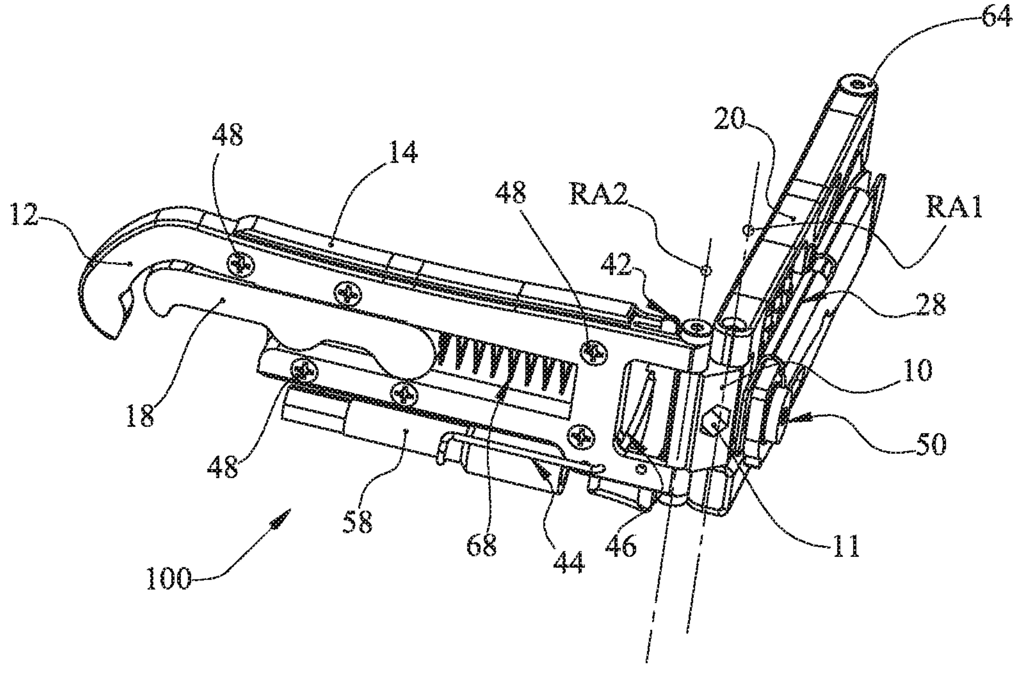
FIG. 9 is yet another perspective view of the multi-tool device of FIG. 1, wherein the first and second halves of the multi-tool device are shown in a partially unfolded state.
Figure 10:
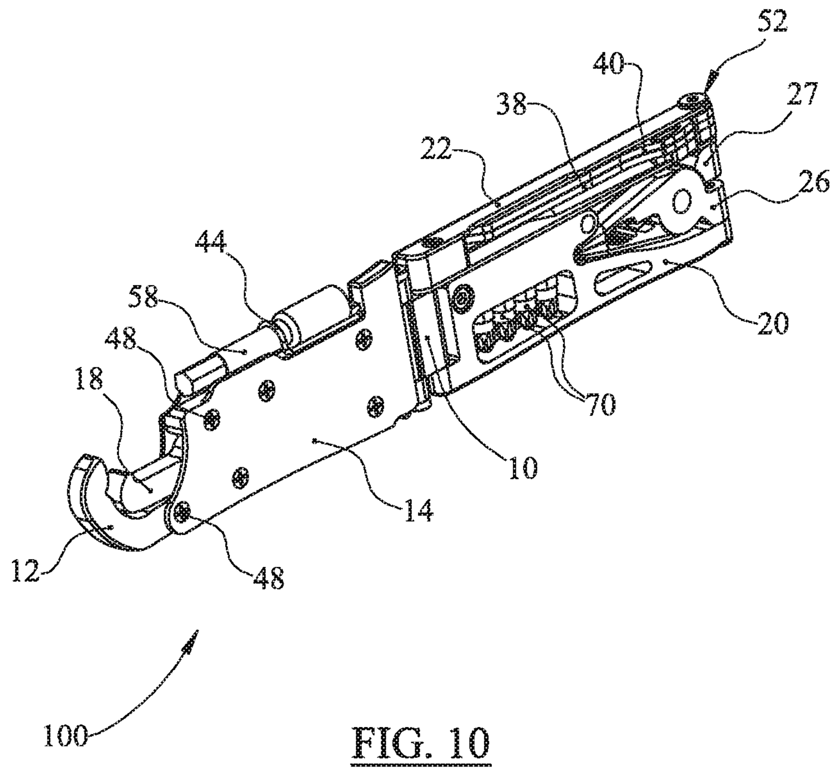
FIG. 10 is a still another perspective view of a multi-tool device, according to an embodiment of the invention, wherein the two halves of the multi-tool device are again illustrated in their unfolded state.
Figure 11:
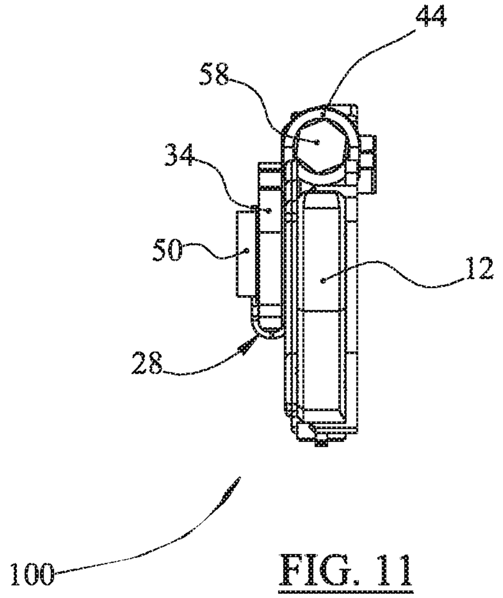
FIG. 11 is another end view of the multi-tool device of FIG. 1, wherein the end of the second half of the multi-tool device containing the wrench is illustrated.
Figure 12:
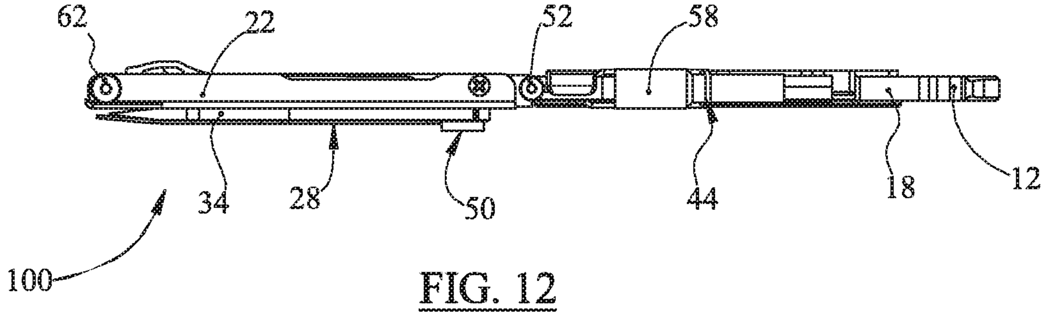
FIG. 12 is another bottom plan view of the multi-tool device of FIG. 1.
Figure 14:
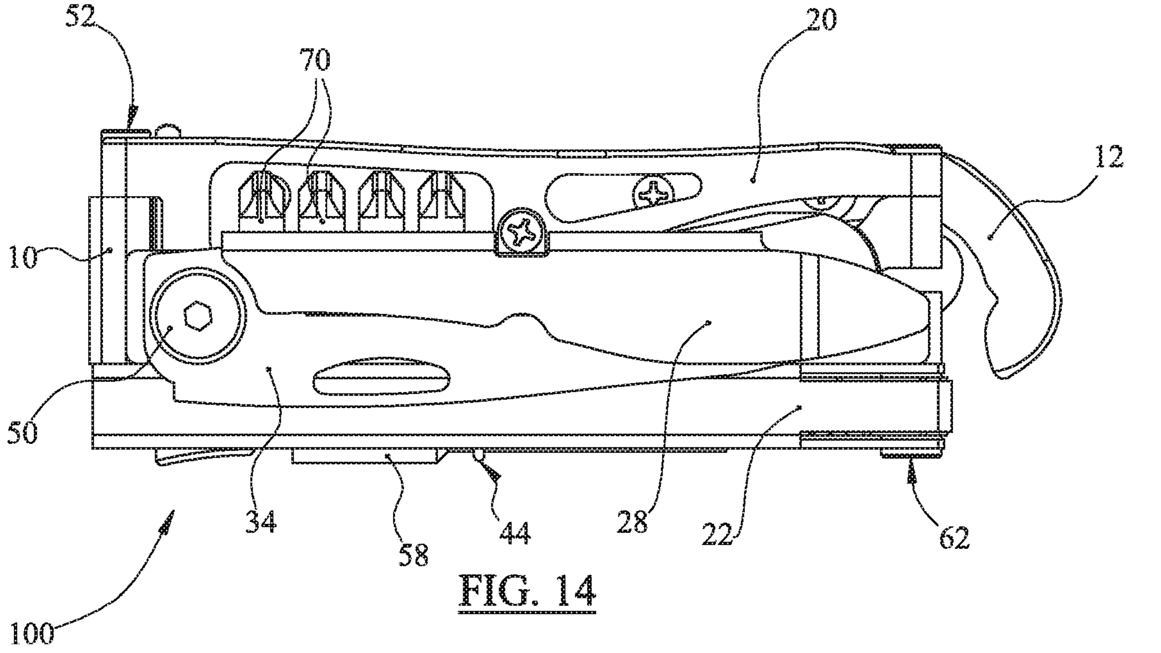
FIG. 14 is a first side elevational view of the multi-tool device of FIG. 1 in its folded state, wherein the side of the multi-tool device containing the folding knife blade is illustrated.
Figure 21:
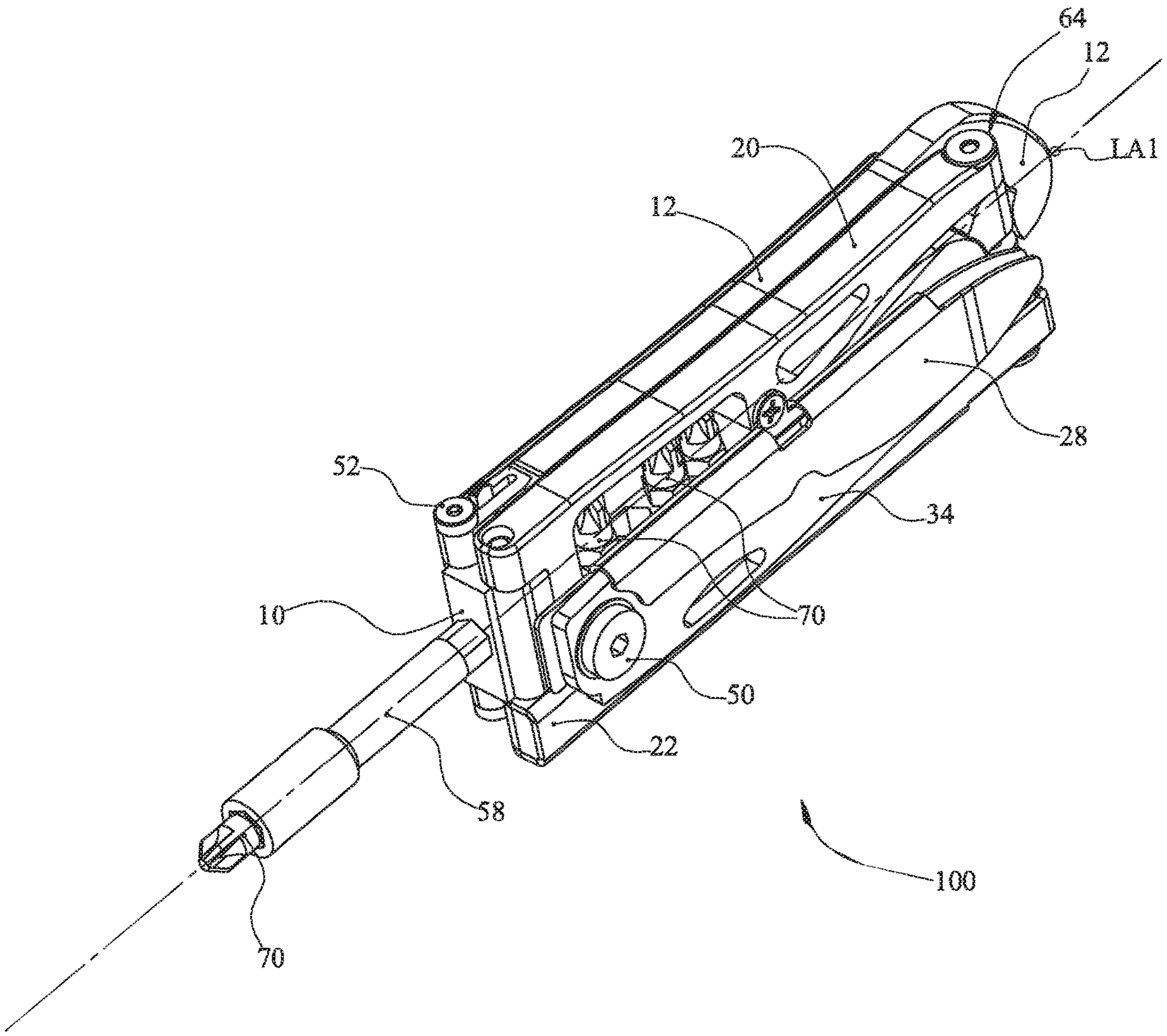
FIG. 21 is a perspective view of the multi-tool device of FIG. 1 in its folded state, wherein a driver bit extension, with a driver bit coupled thereto, is shown inserted in the recess in the hinge member of the multi-tool.

As shown in FIGS. 5 and 9, the first tool subassembly comprises a plurality of tool members, such as folding pliers, a folding knife blade 34, a folding metal saw blade 38, and a folding wood saw blade 40. Similarly, the second tool subassembly also comprises a plurality of tool members, such as the open-ended wrench mechanism described above, and a driver bit extension 58 (e.g., a ¼" hex driving bit extension). In alterative embodiments, rather than having multi-use folding pliers incorporated therein, the first tool subassembly may include scissors, snips, fencing pliers, etc. As best shown in FIGS. 14 and 21, the first tool subassembly comprises a formed cover 28 for covering the sharp blade edge of the folding knife blade 34 when the folding knife blade 34 is in its retracted state (see FIG. 21) so as to prevent a user of the multi-tool device 100 from being inadvertently cut by the knife blade 34. When the user is ready to use the knife, he or she rotates the knife blade 34 approximately 180 degrees about the knife blade pivot bolt 50 until the knife blade 34 is in its extended state (see FIG. 20). As shown in the exploded view of FIG. 25, the knife blade pivot subassembly is further provided with an associated knife blade washer member 36 disposed around the knife blade pivot bolt 50, a complementary threaded fastener 56 on the opposite side of the first tool subassembly that threadingly engages the knife blade pivot bolt 50, and a barrel member 54 forms a threaded barrel for the mounting of the folding knife blade 34 (see FIG. 25).

Figure 3:
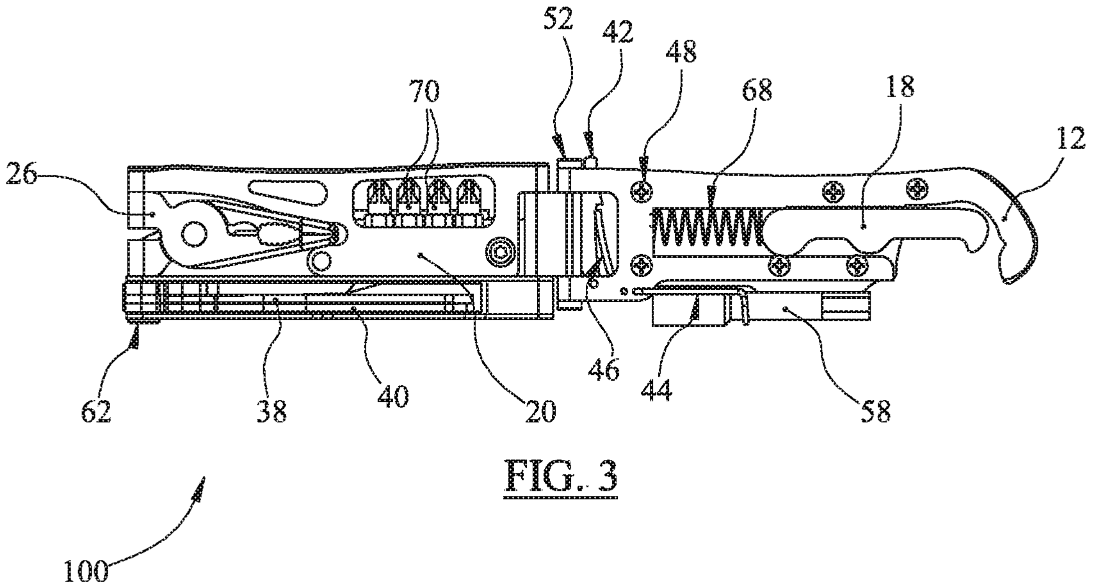
FIG. 3 is a side elevational view of the multi-tool device of FIG. 1, wherein the side cover of the wrench portion of the multi-tool device has been removed so as to illustrate the internal components of the wrench portion.
Figure 4:
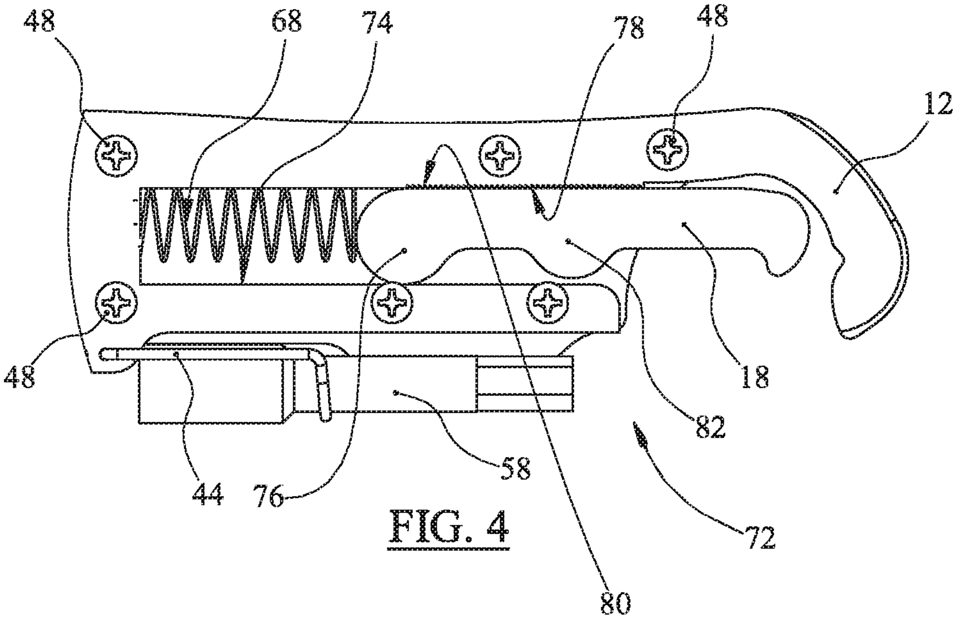
FIG. 4 is an enlarged side elevational view of a wrench portion of the multi-tool device of FIG. 1, wherein the side cover of the wrench portion of multi-tool device has been removed so as to illustrate the internal components of the wrench portion.
Figure 6:
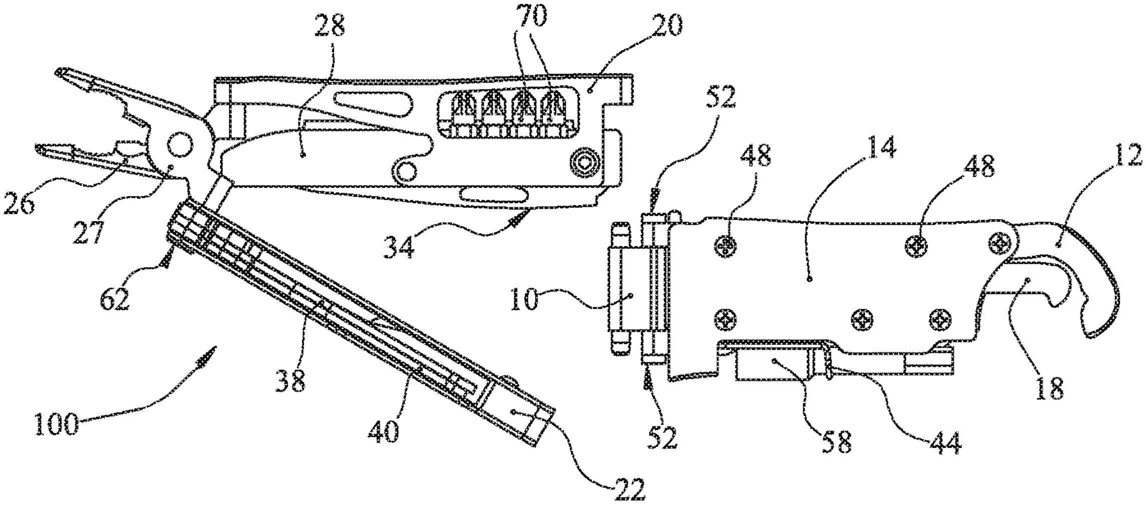
FIG. 6 is a first side elevational view of the multi-tool device as illustrated in FIG. 5, wherein the halves of the multi-tool device are shown separated from one another.

Referring to FIGS. 1, 3 and 6, in the illustrative embodiment, it can be seen that the wrench portion frame 12 of the second tool subassembly is joined to the hinge member 10 by the pair of oppositely disposed fastener members 52.

Now, referring to FIGS. 5-7, the folding pliers on the first tool subassembly will be described. Initially, as shown in FIG. 5, the folding pliers have a first handle end and a second head end with a plier head oppositely disposed relative to the first handle end. The first handle end of the folding pliers comprising a pair of spaced-apart apertures or recesses 84, 86 (see FIG. 5). A first one 84 of the pair of spaced-apart apertures or recesses 84, 86 is disposed on a first handle portion 20 of the folding pliers, and a second one 86 of the pair of spaced-apart apertures or recesses 84, 86 is disposed on a second handle portion 22 of the folding pliers. The spaced-apart apertures or recesses 84, 86 are configured to be collinear with one another in a closed position of the first and second handle portions 20, 22 of the folding pliers (e.g., as depicted in FIG. 1). Referring again to FIG. 5, it can be seen that the hinge member 10 of the multi-tool device 100 further comprises a pair of collinear posts 15, 17 disposed along the first rotational axis RA1 of the hinge member 10 that are configured to be received within respective ones of the spaced-apart apertures 84, 86 when the first tool subassembly is engaged with the second tool subassembly (e.g., as shown in FIG. 1).

Figure 7:
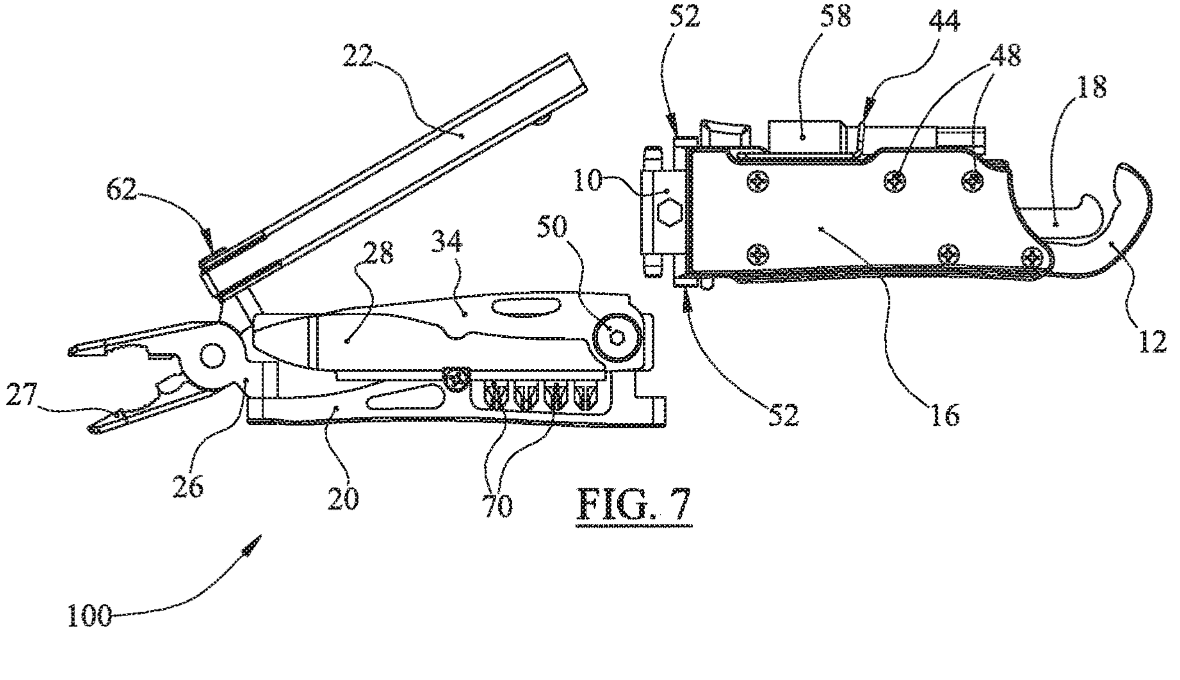
FIG. 7 is a second side elevational view of the multi-tool device as illustrated in FIG. 5, wherein the halves of the multi-tool device are shown separated from one another.
Figure 8:
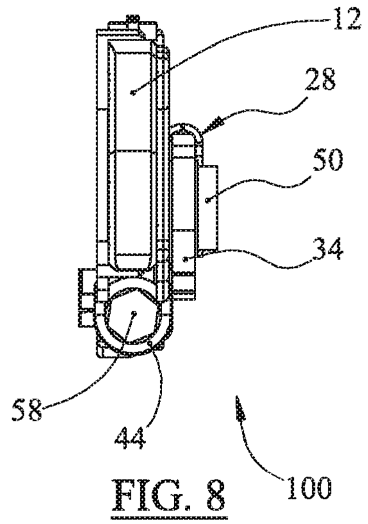
FIG. 8 is an end view of the multi-tool device of FIG. 1, wherein the end of the second half of the multi-tool device containing the wrench is illustrated.

As illustrated in FIGS. 5-7, the first tool subassembly is configured to be detached from the second tool subassembly by disengaging the pair of collinear posts 15, 17 of the hinge member 10 from the respective ones of the spaced-apart apertures or recesses 84, 86 on the first and second handle portions 20, 22 of the folding pliers. Conversely, the first tool subassembly is configured to be attached to the second tool subassembly by engaging the spaced-apart apertures or recesses 84, 86 on the first and second handle portions 20, 22 of the folding pliers with respective ones of the collinear posts 15, 17 of the hinge member 10, and by locking the first and second handle portions 20, 22 of the folding pliers in place relative to one another using the plier head at the second head end of the folding pliers. When the plier head is rotated so as to lock the first and second handle portions 20, 22 of the folding pliers in place relative to one another, the first tool subassembly is constrained to rotation about the first rotational axis RA1 of the hinge member 10. The first and second tool subassemblies may then be rotated independently about their respective axes of constraint (i.e., RA1 and RA2) to a collinear position (see e.g., FIGS. 1 and 13), an offset parallel position at either extreme (see e.g., FIGS. 14-17), or any interim position. The first and second tool subassemblies and hinge interfaces may also have rotation locking mechanisms or rotation stops to limit rotation about their axes in any desired configuration. For example, in the illustrative embodiment, the first tool subassembly (e.g., the plier half) is constrained by stops to a range of 90-180 degrees to the hinge 10, and the second tool subassembly (e.g., the wrench half) is lockable at 90 and 180 degrees.

In the illustrated embodiment, at least one of the first tool subassembly, the second tool subassembly, and the hinge member 10 is further provided with a rotation limiting member 42, 46 to constrain the rotation of the first tool subassembly relative to the second tool subassembly. For example, in the illustrated embodiment, FIG. 1 depicts the thumb stud of the flat pivot hinge lock 42 protruding above the wrench portion frame 12. The flat pivot hinge lock 42 seats in a channel in the hinge member 10 and is rotatably fixed to the wrench tool half to restrict rotation between the hinge 10 and the wrench tool half. Internally, in FIGS. 3 and 9, the flat pivot hinge lock 42 can be seen resting against a cantilevered spring 46 which biases the flat pivot hinge lock 42 towards engagement with the hinge channel parallel to the axis of rotation between the wrench tool half and the hinge 10 (i.e., the spring 46 biases the flat pivot hinge lock 42 to a seated position in the hinge channel). The other tool half relies on the formed knife cover 28 and hinge member geometries. The end of the formed knife cover 28 adjacent the hinge 10 contacts a protrusion face on the hinge member 10 in the unfolded position arresting overrotation (see FIG. 22). The geometry of the multi-tool device 100 is such that the tool half containing the pliers is constrained at its end rotationally about one axis of the hinge member 10 when the tool half is in its own folded configuration, and is freed from constraint upon unfolding of the half.

Figure 25:
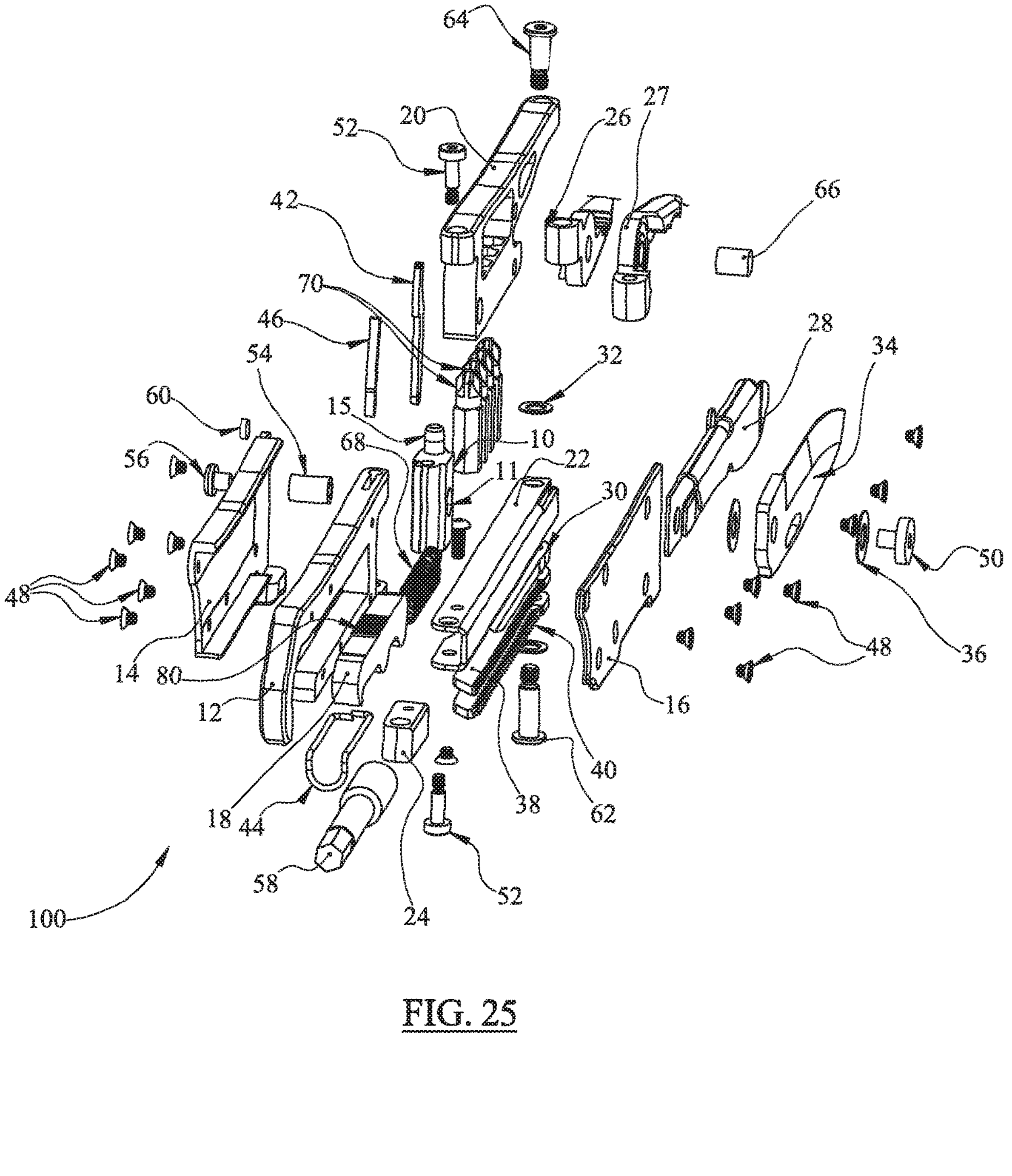
FIG. 25 is an exploded perspective view of the multi-tool device of FIG. 1, wherein the components that form the multi-tool device are shown exploded from one another.

In the illustrative embodiment, with reference to FIGS. 1, 5, and 25, it can be seen that the second handle portion 22 of the folding pliers is provided with the folding metal saw blade 38 and the folding wood saw blade 40 housed therein. In addition, as shown in FIG. 25, the second handle portion 22 may further comprise a combination awl and file 30 housed therein. Also, as shown in FIG. 25, the second handle portion 22 may additionally comprise a pivot insert member 24 disposed within the second handle portion 22 at the end of the second handle portion 22 closest to the hinge member 10 for receiving an end portion of the collinear post 17 of the hinge member 10. The combination awl and file 30, folding metal saw blade 38, and the folding wood saw blade 40 rotate about the fastener member 62. Washer member 32 serves as a bearing pivot for the folding saw blades 38, 40.

Figure 19:
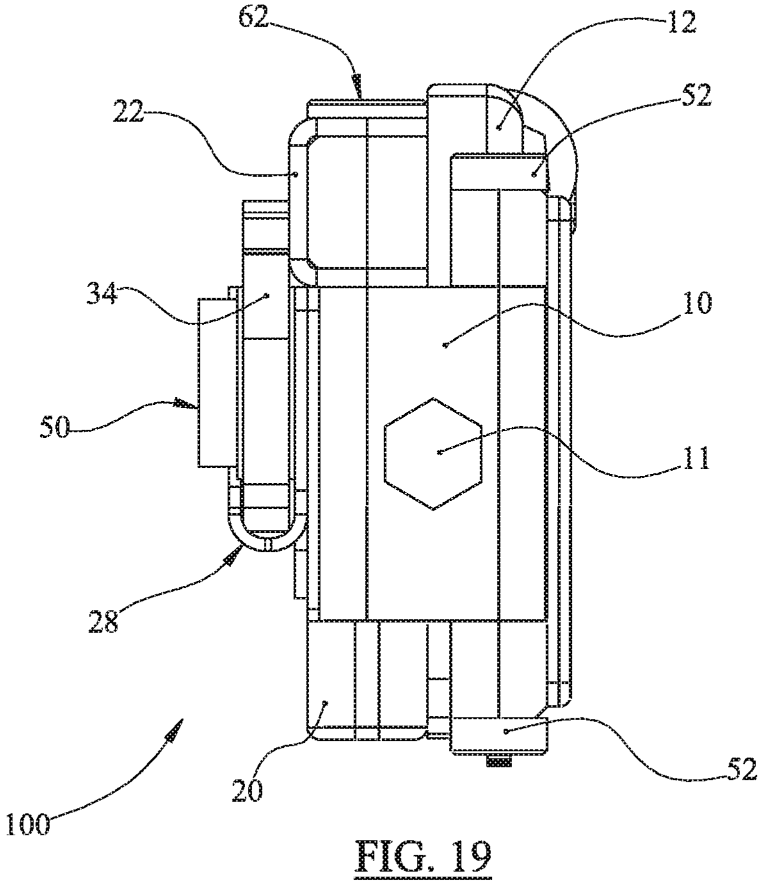
FIG. 19 is a second end view of the multi-tool device of FIG. 1 in its folded state, wherein the hinge member of the multi-tool device is illustrated.
Figure 20:
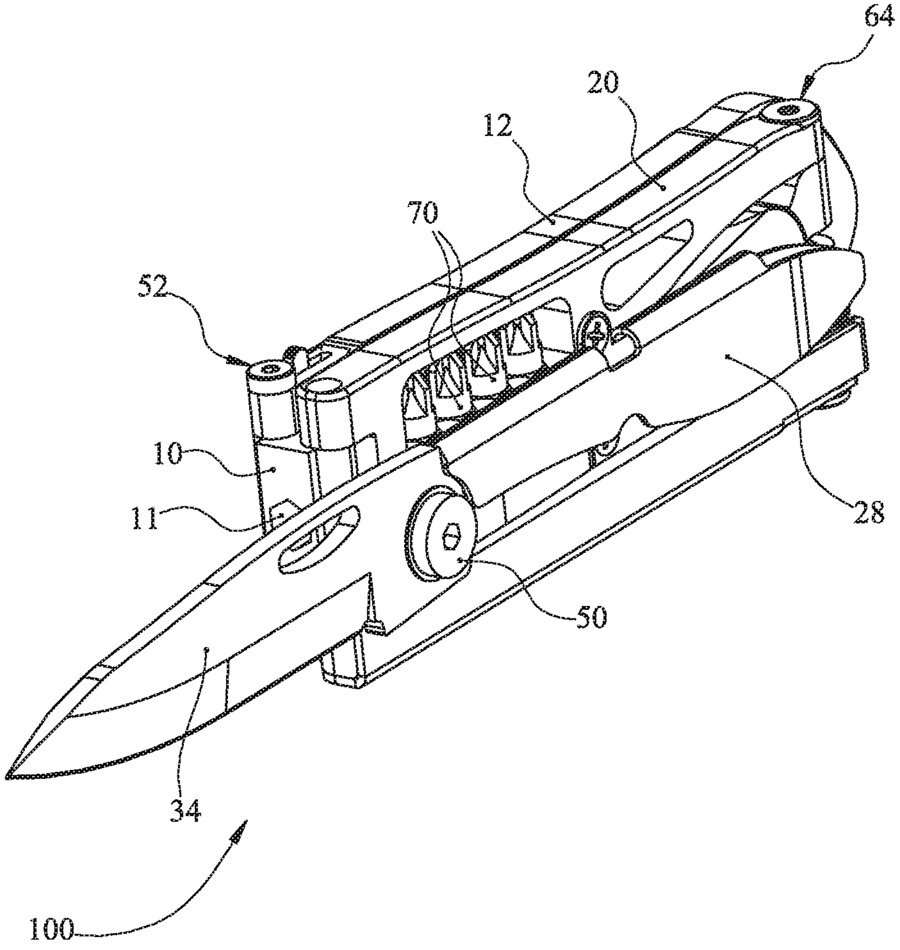
FIG. 20 is a perspective view of the multi-tool device of FIG. 1 in its folded state, wherein the blade of the folding knife is shown extended.

Referring again to FIGS. 5-7 and 9, it can be seen that the hinge member 10 further comprises a first face and a second face oppositely disposed relative to the first face. In the illustrative embodiment, the first outer face of the hinge member 10 is provided with a hex recess 11 (e.g., a ¼" hex recess) formed therein for receiving a fastener driving member (e.g., the end portion of the driver bit extension 58). That is, the recess 11 in the hinge member 10 is configured to receive a fastener driving member for applying a torque to a fastener. As shown in FIGS. 9, 19, and 21, in the illustrative embodiment, the hex recess 11 is substantially centered on the hinge member 10 such that a longitudinal axis LA1 (see FIG. 21) of the hex recess 11 substantially corresponds to a central axis of the multi-tool device 100 when the inner face of the first tool subassembly is folded against the inner face of the second tool subassembly. In an alternative embodiment, the second face of the hinge member 10 may be provided with a driver recess formed therein, rather than the first face. Also, in another alternative embodiment, each of the first and second faces of the hinge member 10 may be provided with a driver recess formed therein for receiving a respective fastener driving member.

As an alternative to, or in addition to the ¼" hex recess depicted in the illustrative embodiment, the face(s) of the hinge member 10 may be provided with other driving suitable geometries, such as a ¼" square boss, etc. The driving geometries may be centered on the central axis of the folded tool for maximum ergonomics, or multiple geometries may be present on a face with slightly decreased ergonomics. Advantageously, the ability of the hinging to allow both sides of the hinge to be presented to the volumetric exterior of the folded tool also allows two driving geometries to be embodied on the central axis of the tool, one on either side of the hinge 10.

Figure 22:
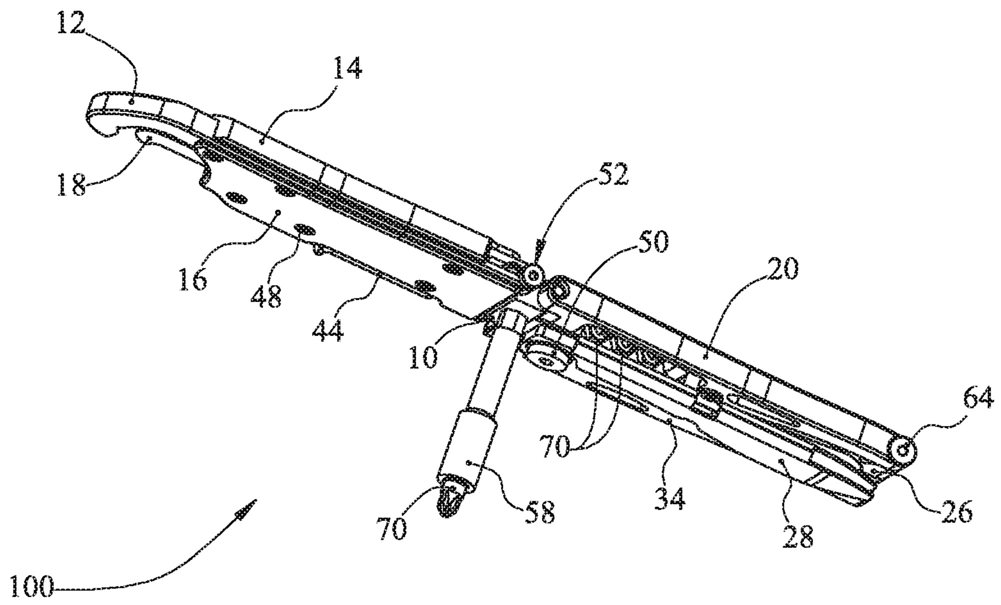
FIG. 22 is a perspective view of the multi-tool device of FIG. 1 in its unfolded state, wherein the driver bit extension, with the driver bit coupled thereto, is shown inserted in the recess in the hinge member of the multi-tool, the extended position of the halves of the multi-tool device serving as a dual handle so as to allow a substantial torque to be applied by a user on the fastener being driven by the driver bit.
Figure 23:
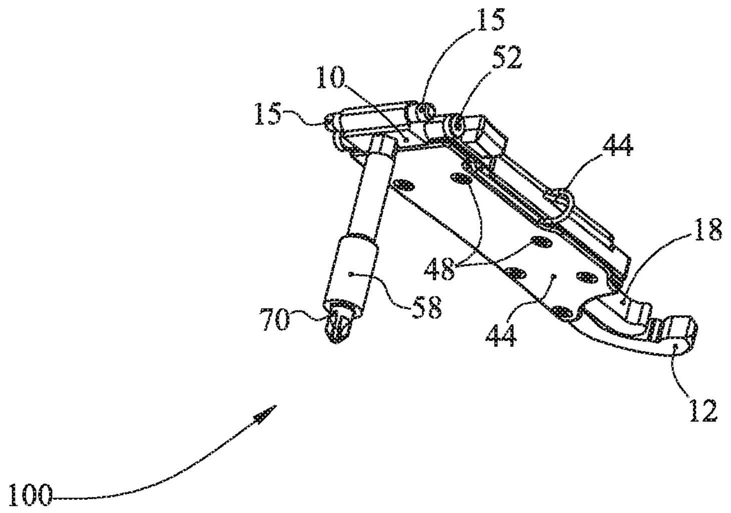
FIG. 23 is a perspective view of the wrench portion of the multi-tool device of FIG. 1, wherein the driver bit extension, with the driver bit coupled thereto, is shown inserted in the recess in the hinge member of the multi-tool, and the wrench portion of the multi-tool device is shown serving as a single handle for applying a torque to the fastener being driven by the driver bit.

It is readily apparent that the aforedescribed structure and functionality of the separable hinging of the multi-tool device 100 offers numerous features and benefits. First of all, the separable hinging configuration of the multi-tool device 100 advantageously allows user customization of the multi-tool device 100 through the pairing of modular halves comprised of various tools. Secondly, when the first and second tool subassemblies are joined together, one half of the tool can be used to extend the useful lever length of its paired tool. This is especially beneficial if the paired tool is used primarily as a torqueing device, such as a wrench or pry bar, or otherwise benefits from additional length in use. Thirdly, the tool can be configured to aid in specific tasks, such as orienting the two (2) tool halves at 135 degrees relative to one another so as form a saw handle approximation, or the two halves may be locked at 90 degrees relative to one another so as to allow a new two handed, reinforced cutting grip for the knife, etc. Fourthly, the geometry places the fastener driving axis of rotation at or near the central axis of the tool in folded mode (e.g., as shown in FIG. 21), providing excellent ergonomics for driving. Fifthly, the tool places the fastener driving axis at or near the center of length when at full length, allowing the tool to be used as a T handle driver (e.g., as shown in FIG. 22). Sixthly, when one half of the tool is removed (e.g., as shown in FIG. 23), the hinge 10 is able to still provide driver functionality at any angle, allowing the coupled remaining tool half and hinge 10 to function still as a screwdriver, or as a right angle driver. Seventhly, with a tool half removed, it can work in tandem with the other half. In this case, the wrench or screwdriver can work in tandem with the pliers. For example, the wrench can turn a nut while the pliers hold the bolt head. Eighthly, given the folding nature of the tool, methods that fix the tool in a closed position (e.g., locks, magnets, etc.) are able to clasp the tool over the top of a pocket or belt for carrying. In the one or more embodiments, the multi-tool device 100 may be provided with a magnet 60 (see FIG. 25) for retaining the device 100 in a closed position (i.e., folded state) if the device 100 is formed from a magnetic metallic material. Ninthly, the two halves of the tool can be used to disassemble each other for cleaning in some embodiments. Tenthly, the multi-tool device 100 described herein advantageously allows compact, convenient carrying of multiple tools.

Now, turning again to FIGS. 5-7, the folding pliers on the first tool subassembly of the multi-tool device 100 will be further described. As explained above, the pair of folding pliers include a plier handle body portion and a plier head portion coupled to the plier handle portion (see FIG. 5). The plier handle body portion includes a first handle member 20 and a second handle member 22. The plier head portion including a first jaw member 26 pivotally coupled to a second jaw member 27 about a jaw rotational axis RA3 (see FIG. 5). In the illustrative embodiment, the plier head portion is configured to be folded into the plier handle body portion in a stowed configuration of the folding pliers. Each of the first and second jaw members 26, 27 have first ends for engaging an object being manipulated by the pliers and oppositely disposed second ends that are pivotally coupled to respective first and second handle members 20, 22. The second ends of first and second jaw members 26, 27 configured to pivot relative to the respective first and second handle members 20, 22 about respective rotational axes RA4, RAS. As shown in FIG. 1, in the illustrative embodiment, the first jaw member 26 is pivotally coupled to the first handle member 20 by means of the fastener member 64 (e.g., an ultra low profile shoulder screw), while the second jaw member 27 is pivotally coupled to the second handle member 22 by means of the fastener member 62 (e.g., ultra low profile shoulder screw). The first and second jaw members 26, 27 are pivotally coupled to one another by means of the plier pivot rivet 66 so that jaw members 26, 27 are able to rotate about the jaw rotational axis RA3 (see FIG. 5).

Figure 13:
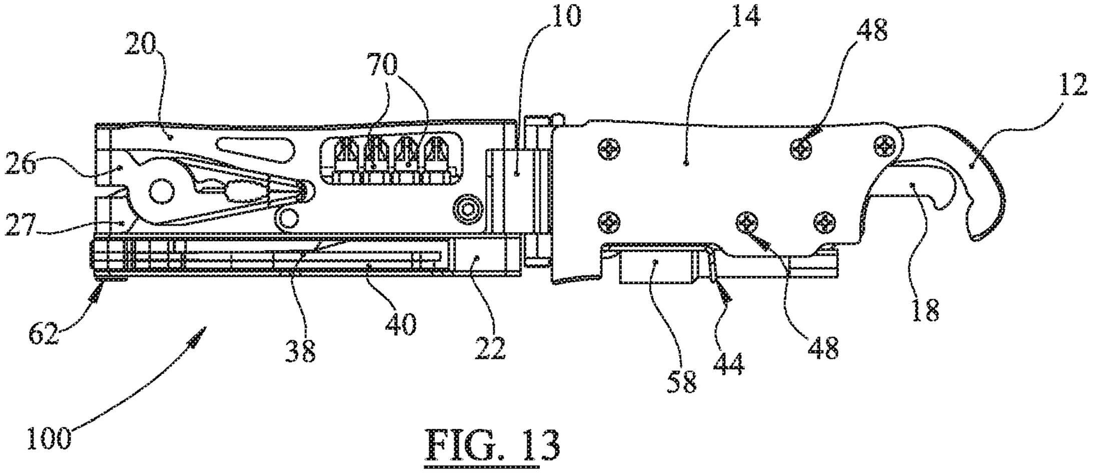
FIG. 13 is another side elevational view of the multi-tool device of FIG. 1, wherein the side cover is disposed on the wrench portion of multi-tool device.

With combined reference to FIGS. 5 and 13, it can be seen that, in the illustrative embodiment, the second handle member 22 is foldable relative to the first handle member 20 about the jaw rotational axis RA3 so as to define an operative, unfolded state of the folding pliers (e.g., as depicted in FIGS. 5-7) and an inoperative, folded state of the folding pliers (e.g., as depicted in FIG. 13). When the folding pliers are in the folded state (as shown in FIG. 13), the rotational axes RA4, RA5 about which the second ends of the first and second jaw members 26, 27 are configured to pivot relative to the respective first and second handle members 20, 22 are collinear with one another. As shown in FIGS. 5-7, the first and second handle members 20, 22 are pivotally coupled to outer faces of the first and second jaw members 26, 27 at the second ends of first and second jaw members 26, 27. When the folding pliers are in the folded state (i.e., as depicted in FIG. 13), the first and second handle members 20, 22 are disposed generally parallel to one another. Also, when the plier head portion is folded into the plier handle body portion as shown in FIG. 13, the first and second handle members 20, 22 are locked into the folded state.

In the illustrative embodiment, with reference to FIG. 5, it can be seen that the first handle member 20 comprises a notch 88 formed therein for receiving a tip of the plier head portion so as to fix the first and second jaw members 26, 27 into a closed position. When the plier jaws 26, 27 are closed and rotated into a position as to be contained between the inside faces of the handles 20, 22 and flush to the top and bottom faces of the handles 20, 22, the tip of the pliers rotates into the corresponding notch 88 in the geometry of the handle 20, constraining the plier head from opening. This in turn locks the now constrained plier handles 20, 22 in position when seated in the corresponding geometry on the twin axis hinge. This allows the first tool subassembly (i.e., first tool half) to be used as an integral part of the tool whole as a leverage extension, handle, etc. Other alternative tool half embodiments could fold on differently oriented axes for other applications provided mating geometry exists to interface with the hinge upon closing, and a method is employed to constrain the handles on the hinge.

It is readily apparent that the aforedescribed innovative design of the folding, locking pliers of the multi-tool device 100 offers numerous features and benefits. First of all, the folding, locking pliers are compact, which contributes to the overall compactness of the multi-tool device 100. Secondly, the design of the folding, locking pliers advantageously allows some handle surfaces to be adjacent to other surfaces in different configurations for constraint of smaller components inside. Thirdly, the design of the folding, locking pliers allows plier head to be used at various angles to the handle. Fourthly, the design of the folding, locking pliers allows the tool half to be used as an extension to the tool whole for leverage, etc. Fifthly, the design of the folding, locking pliers integrates the locking of the tool half to the whole for simplification of use and manufacture.

Figure 24:
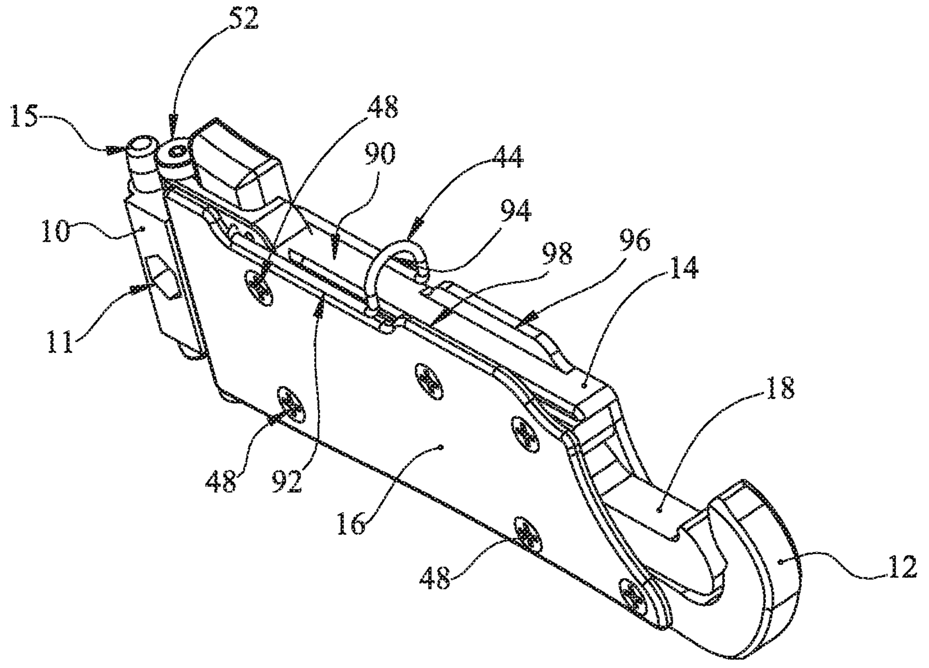
FIG. 24 is another perspective view of the wrench portion of the multi-tool device of FIG. 1, wherein the driver bit recess in the hinge member of the multi-tool device is illustrated.

Next, with reference to FIGS. 1, 15, 16, and 24, the driver bit extension holding portion of the multi-tool device 100 of the illustrative embodiment will be explained. The driver bit extension holding portion is provided on the tool body portion of the multi-tool device 100. Specifically, in the illustrative embodiment, the driver bit extension holding portion is provided on the second tool subassembly, adjacent to the open-ended wrench mechanism (see FIG. 15). As shown in FIGS. 15 and 24, the driver bit extension holding portion generally comprises (i) a driver bit extension cradle 90 formed by the tool body portion (i.e., the body portion of the second tool subassembly comprises a cavity or recess formed therein), the driver bit extension cradle 90 configured to receive a portion of a driver bit extension 58 (as shown in FIG. 15); and a retention member 44 configured to retain the driver bit extension 58 in the driver bit extension cradle 90 (see FIG. 24), the retention member 44 configured to extend along a portion of the length of the driver bit extension 58 and circumscribe a circumferential portion of the driver bit extension 58 (see FIGS. 15 and 16). In the illustrative embodiment, the driver bit extension cradle 90 has receiving geometry sufficient to cradle the driver bit extension 58. For example, as shown in FIG. 24, the flange portion 96 of the first cover member 14 and the flange portion 98 of the second cover member 16 form side bearing surfaces for the cradling effect of the driver bit extension 58. Also, as shown in FIG. 24, the cradle 90 has a floor disposed between the flange portions 96, 98 of the first and second cover members 14, 16.

In the illustrative embodiment, the retention member 44 of the driver bit extension holding portion is in the form of a cantilevered carabiner-style spring member (see FIGS. 15 and 24) configured to apply a retaining force to the driver bit extension 58 that directs the driver bit extension 58 into the driver bit extension cradle 90. As shown in FIG. 15, the cantilevered spring member 44 comprises longitudinally-extending section 92 and a downturned semicircular section 94 that is configured to circumscribe a circumferential portion of the driver bit extension 58.

As shown in the illustrative embodiment of FIGS. 1 and 21, the first handle portion 20 of the folding pliers comprises a bit storage cavity formed therein for receiving a plurality of bit members 70 (e.g., for receiving four (4) single end quarter bits). A bottom wall of the bit storage cavity is provided with a plurality of bit recesses 21 formed therein for receiving the bit members 70 in a friction fit type engagement (see FIG. 1).

The downturned semicircular section 94 of the cantilevered spring member 44 is configured to apply the retaining force to the driver bit extension 58. In the illustrative embodiment, the downturned semicircular section 94 of the spring 44 has an inner radius equal to or given some tolerance over the outer diameter of the driver bit extension 58 where it is to be pinned in a plane normal to the length of the spring 44 to capture the round or otherwise cross section of the driver bit extension. The downturned semicircular section 94 of the spring 44 applies the capturing force to the driver bit extension. The cradling geometry provides a stop to arrest the driver bit extension sliding from under the spring 44 in the direction of its larger diameter portion, and the downturned semicircular section 94 of the spring 44 also serves the same function for sliding in the opposite direction. The larger diameter section of the driver bit extension 58 may be grasped and pulled in a direction normal away from the cradling geometry. This force will rotate the spring 44 up about its opposite end deforming the spring 44 open. The driver bit extension 58 can be rotated against the spring 44 sufficiently to reach an orientation so as to be slid past the stop of the cradling geometry. The driver bit extension 58 can be axially withdrawn from the holder in this orientation and the spring 44 will return to its resting position, now empty. Installation of the driver bit extension 58 in the holder is the reverse of this procedure.

It is readily apparent that the aforedescribed innovative design of the driver bit extension holding portion of the multi-tool device 100 offers numerous features and benefits. First of all, the driver bit extension holding portion provides dependable retention of the driver bit extension 58. Secondly, the driver bit extension holding portion of the multi-tool device 100 enables easy, one hand insertion and removal of the driver bit extension 58. Thirdly, the driver bit extension holding portion allows easy replacement of the spring 44, if necessary. Fourthly, the cradling geometry of the driver bit extension holding portion is able to be integrated directly into the morphology of the tool for lowered part count and ease of manufacture.

Figure 26:
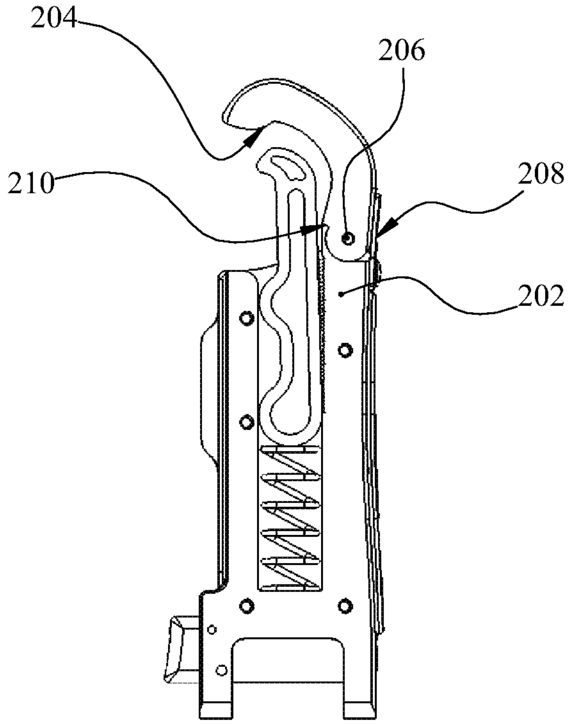
FIG. 26 is a side elevation view of an alternative embodiment of the second half of the multi-tool device, shown with a double spring wrench, showing second outer jaw portion biased closed.
Figure 27:
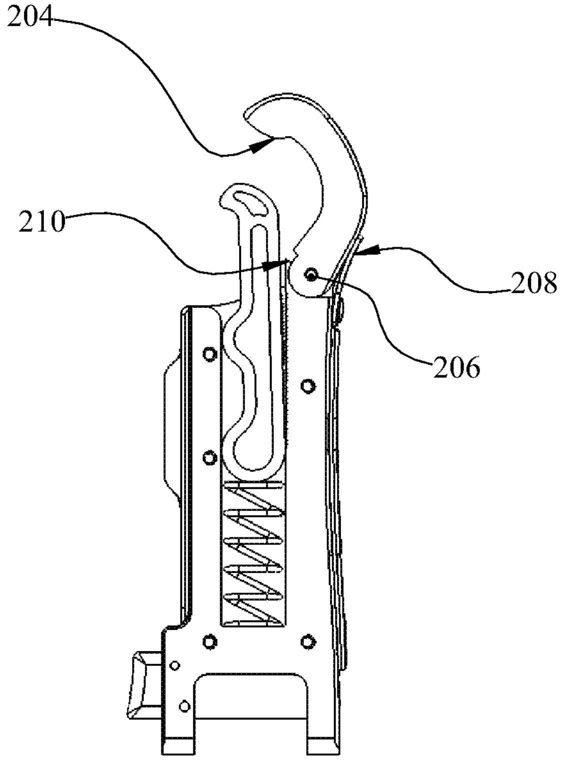
FIG. 27 is the side elevation view of FIG. 26, showing the second outer jaw portion rotated open.

FIGS. 26 & 27 depict a double spring wrench embodiment wherein the inner jaw 18 functions identically to the main embodiment described herein. The outer jaw member 12 comprises first and second outer jaw portions 202, 204 (collectively referred to as an appendage) being hingedly connected via pin 206, and biased closed by a spring, here embodied by a flat cantilever spring 208. It should be understood that other types of springs are feasible.

The first outer jaw portion 202 includes a stop 210 which limits travel in the closed position establishing a normal bearing surface with the first bearing face 78 of the wrench frame member 12 and the second bearing face 80 of the inner jaw member 18. This is desirable to simplify application of the tool. At this stop position, the bearing surface is normal to the hinge axis and the appendage acts as a two force member, rotationally stable and impervious to slip. The inner jaw 18 is locked as described, and, combined with outer jaw member 12, the two together transmit the torque applied to the handle. Upon counter-rotation of the tool, reaction forces disengage the inner jaw lock, which is then ready to cam, and the second outer jaw portion 204 (aka outer finger) is free to be rotated open by reaction forces from the fastener face, camming as well. Self-adjustment and ratcheting are achieved over a large range.

Figure 28:
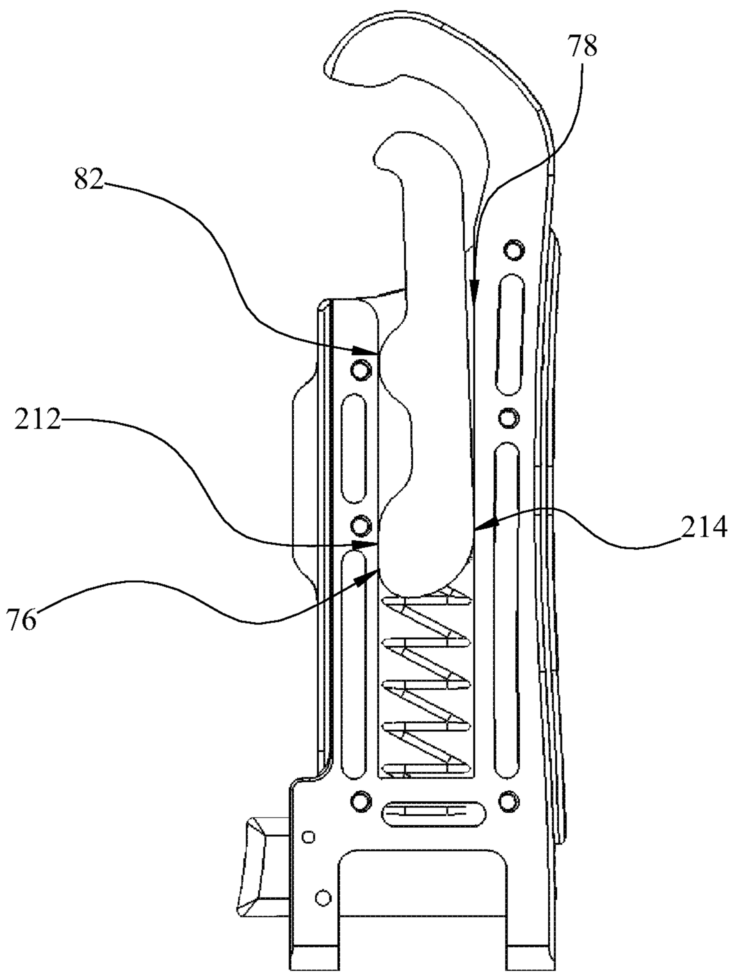
FIG. 28 is a side elevation view of an alternative embodiment of the second half of the multi-tool device, shown with a cam lock inner jaw pivot wrench.

FIG. 28 depicts a cam lock wrench embodiment wherein the inner jaw pivot 76 is no longer circular, but lobed with a cross section width equal to a slip fit in the channel when rotated to the rotation limiting stop 82. When rotated towards the frame (i.e. towards first bearing face 78) by reaction forces from the fastener, two points (first and second points) 212, 214 on the pivot 76 offset from one another along the line of action come into contact with the inside faces of the channel and wedge against them. Friction from the normal reaction forces arrests the travel of the jaw on the line of action of the channel and torque can be transmitted to the fastener. The opposed rack gear teeth are omitted and the jaw can be arrested at any position on its range, making for infinite adjustability in contrast the discreet positions achieved with gear teeth.

Figure 29:
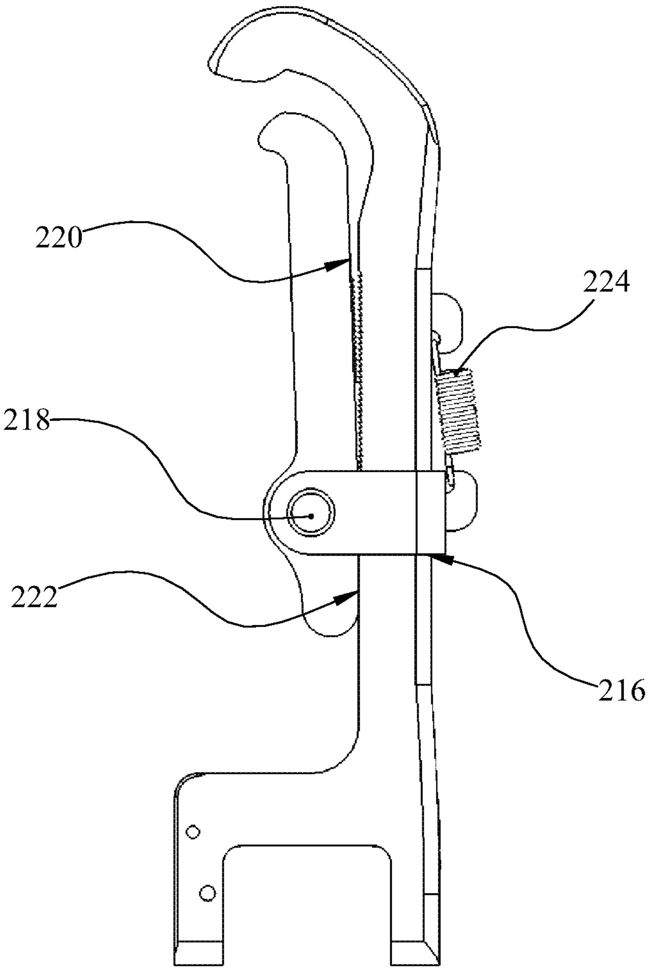
FIG. 29 is a side elevation view of an alternative embodiment of the second half of the multi-tool device, shown with a linear shaft wrench.

FIG. 29 depicts a linear shaft wrench embodiment wherein the primary kinematics are achieved through a sleeve 216 on the frame effecting a linear slide. The inner jaw 18 is pivotably connected to the sleeve at 218. The jaw side adjacent the frame is comprised of two flat facets (first and second facets) 220, 222 joined by a fillet of equal radius to the hinge center distance to the frame face and at an angle representing the desired rotation range. The jaw is constrained in this way to a set uniform hinge distance to the frame upon the range of the linear slide. The inner jaw is free to rotate between two set angles, the range set by the two facets 220, 222 alternately contacting the frame at the maxima and minima of the rotational range. The rotation limitation necessary for the kinematics of locking and ratcheting are thus achieved. The slide and jaw assembly are biased towards a closed jaw position by any sufficient geometry of spring 224, equivalent to the main embodiment of the kinematics described prior.

Figure 30:
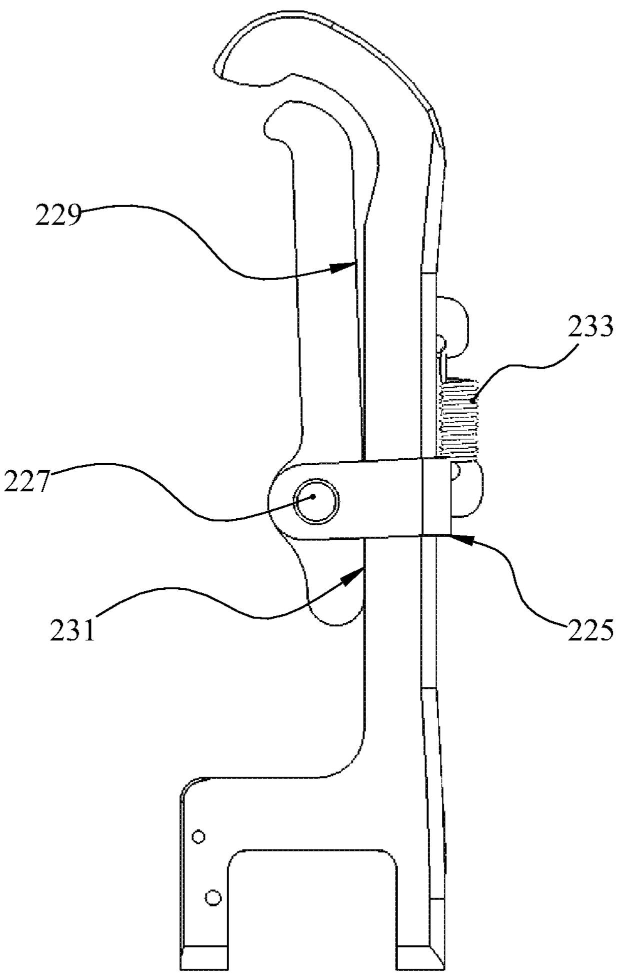
FIG. 30 is a side elevation view of an alternative embodiment of the second half of the multi-tool device, shown with a cam wrap wrench.

FIG. 30 depicts a cam wrap wrench embodiment wherein the primary kinematics are achieved through a sleeve 225 on the frame effecting a linear slide. The inner jaw 18 is fixed rigid to the sleeve at 227. The jaw side adjacent the frame is comprised of two flat facets 229, 231 joined by a fillet of equal radius to the hinge center distance to the frame face and at an angle representing the desired rotation range. The stop face representing the open limit of rotation is fixed parallel and a fixed distance from the opposite inner face of the sleeve. When in the open position, the jaw assembly slides freely on the frame. When biased closed by reaction forces upon the fastener from torque, the inside face of the sleeve is forced into contact with the frame, as is the filleted radius of the jaw aforementioned. The resulting friction from these reactions arrests the jaw and torque can be transmitted. Gear teeth are omitted in this embodiment.

Figure 31:
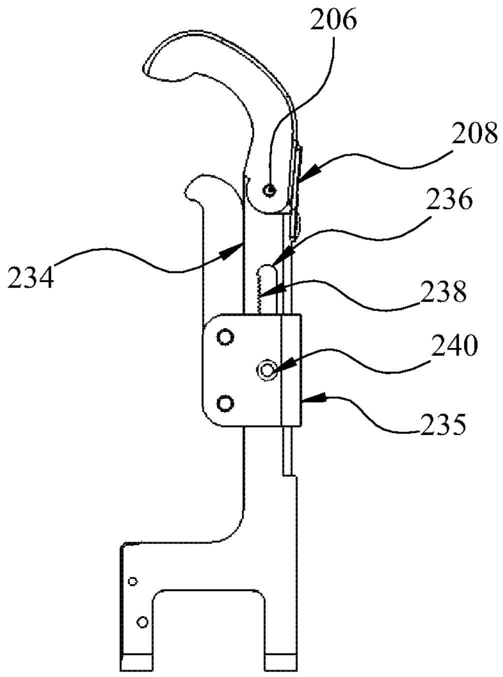
FIG. 31 is a side elevation view of an alternative embodiment of the second half of the multi-tool device, shown with a variable range wrench, showing second outer jaw portion in the closed position.
Figure 32:
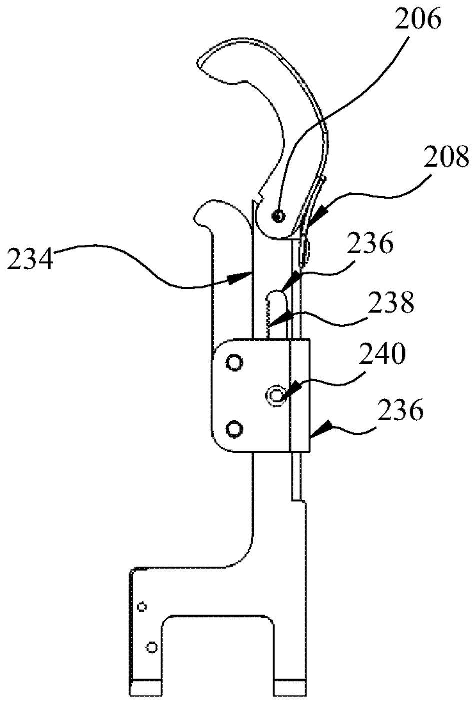
FIG. 32 is the side elevation view of FIG. 31, showing the second outer jaw portion rotated open.
Figure 33:
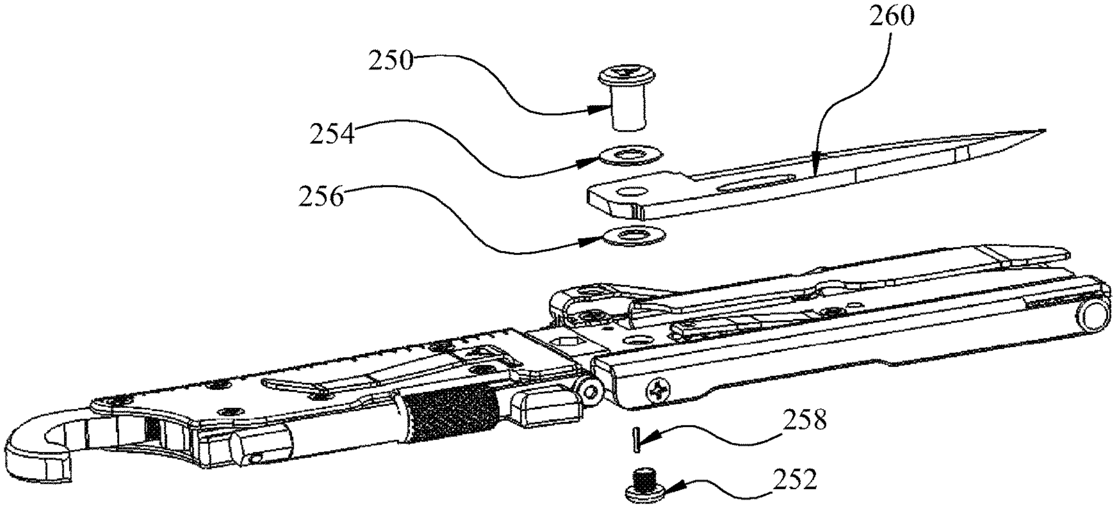
FIG. 33 is a perspective view of an alternative embodiment of the pivot assembly of the multi-tool device, shown with an exploded view of a keyed constant tension pivot.
Figure 34A:
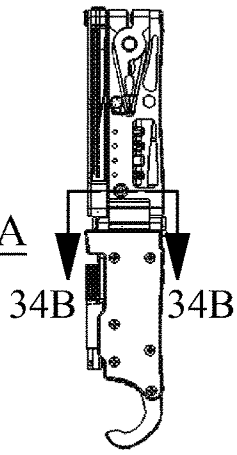
FIG. 34A is a bottom elevation view of the assembled multi-tool device of FIG. 33.
Figure 34C:
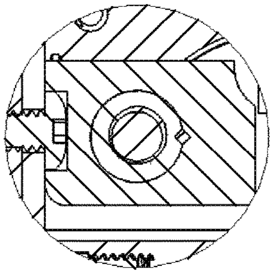
FIG. 34C is a partial cross sectional view through the keyed constant tension pivot of the multi-tool device of FIG. 34B.
Figure 34B:
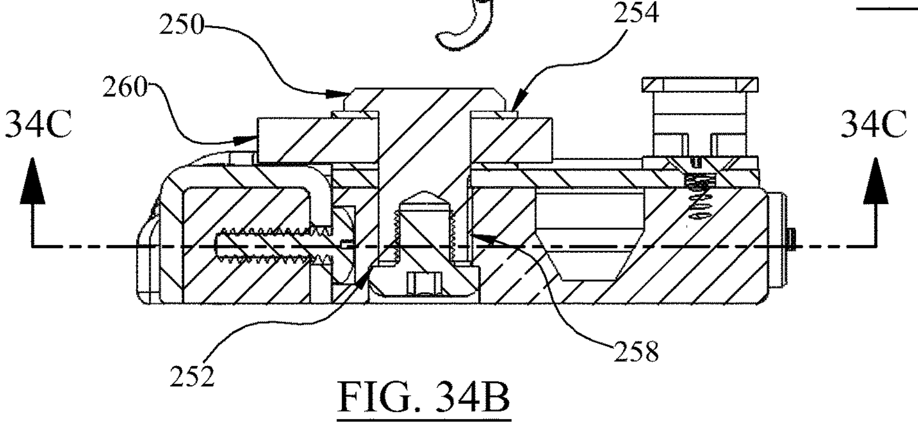
FIG. 34B is an enlarged cross sectional view through the keyed constant tension pivot of the multi-tool device of FIG. 34A.

FIGS. 31 & 32 depict a variable range wrench embodiment wherein the modified kinematics are achieved through a sleeve 235 on the frame effecting a linear slide. The inner jaw 18 is fixed rigid to the sleeve. The jaw side adjacent the frame is comprised of one flat facet 234. This facet is parallel to the inner frame face and held in contact by the width of the sleeve opening. The sleeve is lockable in discrete positions upon its range of travel on the frame by a lock that arrests linear travel comprising sleeve locking member 236 having teeth 238. The outer jaw member 12 is hinged and spring biased as described in previous embodiments. The range of a wrench with only the movable spring biased outer jaw is limited, but the same range can be offset larger and smaller with the movable, lockable inner jaw.

FIGS. 33 & 34A-34C depict a keyed constant tension pivot embodiment wherein the pivot assembly consists of the plier frame handle with circular grooved aperture/hole, a grooved, internal thread pivot barrel 250, a screw 252, two bearing washers 254, 256 a length of square wire 258 to act as a key, and the blade 260. The grooves in the frame aperture and barrel are aligned with the insertion axis of the fasteners. The grooves represent half the cross section of the wire, and when aligned provide a key way for the wire. Inserting the wire prevents rotation of the pivot barrel in its recess. The corresponding screw rests on a shoulder in the frame aperture, and functions as a lead screw for the pivot barrel. In this configuration, the pivot may not rotate, and the blade must rotate relative to the barrel to open. As this rotation cannot be transmitted to the fastener, the fastener is not submitted to alternating movement resulting cumulatively in loosening of the set pivot tension. The pivot becomes similar to a vise/clamp and the preferred friction can be set semi-permanently by the user for the opening action they prefer.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

What is claimed is:

1. A multi-tool device, comprising:

a handle portion; and an open-ended wrench mechanism, the open-ended wrench mechanism including:

a wrench frame member that defines an outer jaw portion of the open-ended wrench mechanism, the wrench frame member further defining a slot therein;

an inner jaw member displaceably coupled to the wrench frame member by means of a semi-circular sliding pivot formed in an end of the inner jaw member, a portion of the inner jaw member being received within the slot of the wrench frame member, whereby the inner jaw member is adapted to rotate about the semi-circular sliding pivot;

a middle portion of the inner jaw member forming a semi-circular protrusion; and a spring member configured to bias the inner jaw member towards a closed position with the outer jaw portion of the wrench frame member;

wherein the outer jaw portion of the wrench frame member is configured to cooperate with the inner jaw member so as to permit the open-ended wrench mechanism to apply a torque to a fastener when a user applies a force to the open-ended wrench mechanism.

2. The multi-tool device according to claim 1, wherein the wrench frame member comprises a first bearing face and the inner jaw member comprises a second bearing face, the first bearing face of the wrench frame member being disposed in an opposed relationship with the second bearing face of the inner jaw member, the first bearing face of the wrench frame member having a first set of contours configured to cooperate with a second set of contours on the second bearing face of the inner jaw member;

wherein, when the open-ended wrench mechanism is in an engaged, tightening position, the first and second sets of contours of the respective first and second bearing faces are configured to provide a tightening contact between fastener contact faces of the open-ended wrench mechanism and the fastener at a predetermined angle relative to a line of action of the sliding pivot as the open-ended wrench mechanism is being rotated in a tightening direction; and wherein, when the first and second bearing faces of the open-ended wrench mechanism are in a non-engaged position, the fastener contact faces are configured to operate as follower surfaces of the open-ended wrench mechanism around the fastener as the open-ended wrench mechanism is being rotated relative to the fastener in a non-tightening direction.

3. The multi-tool device according to claim 2, wherein the first bearing face of the wrench frame member comprises a first rack gear portion forming the first set of contours, and second bearing face of the inner jaw member comprises a second rack gear portion forming the second set of contours, the first rack gear portion being disposed in an opposed relationship with the second rack gear portion.

4. The multi-tool device according to claim 1, wherein the semi-circular protrusion of the inner jaw member comprises a rotation limiting member configured to constrain rotation of the inner jaw member to a predetermined angle about the sliding pivot so as to limit the rotation of the inner jaw member relative to the wrench frame member.

* * * * *